United States Patent
Suzuki et al.

(10) Patent No.: US 7,802,895 B2
(45) Date of Patent: Sep. 28, 2010

(54) DIRECT-TYPE BACKLIGHT DEVICE

(75) Inventors: Toshiaki Suzuki, Tokyo (JP); Keisuke Tsukada, Tokyo (JP)

(73) Assignee: Zeon Corporation, Tokyo (JP)

( * ) Notice: Subject to any disclaimer, the term of this patent is extended or adjusted under 35 U.S.C. 154(b) by 203 days.

(21) Appl. No.: 12/225,205

(22) PCT Filed: Mar. 28, 2007

(86) PCT No.: PCT/JP2007/056629
§ 371 (c)(1),
(2), (4) Date: Sep. 16, 2008

(87) PCT Pub. No.: WO2007/114158
PCT Pub. Date: Oct. 11, 2007

(65) Prior Publication Data
US 2009/0268430 A1   Oct. 29, 2009

(30) Foreign Application Priority Data
Mar. 31, 2006   (JP) ............................. 2006-096743

(51) Int. Cl.
*F21V 7/04* (2006.01)
*F21V 13/10* (2006.01)

(52) U.S. Cl. ...................... 362/97.3; 362/97.1; 362/330

(58) Field of Classification Search ....... 362/97.1–97.4, 362/330, 223–225, 561, 555, 612, 613, 800, 362/230, 231
See application file for complete search history.

(56) References Cited

U.S. PATENT DOCUMENTS 7,661,835 B2 * 2/2010 Chou et al. ................ 362/97.3

FOREIGN PATENT DOCUMENTS

| EP | 1 748 250 A1 | 1/2007 |
|---|---|---|
| JP | 6-250178 A | 9/1994 |
| JP | 6-273760 A | 9/1994 |
| JP | 3114467 U | 8/2005 |
| JP | 2005-322524 A | 11/2005 |
| JP | 2005-332680 A | 12/2005 |

* cited by examiner

*Primary Examiner*—Bao Q Truong
(74) *Attorney, Agent, or Firm*—Birch Stewart Kolasch & Birch, LLP

(57) ABSTRACT

The direct-type backlight device of the present invention includes a reflecting plate, a plurality of point light sources and a light diffusing plate in this order. A light emitting surface of the light diffusing plate is provided with a fine concavo-convex structure which is a split image forming member. By the fine concavo-convex structure, images $A_1$, $B_1$, $C_1$ and $D_1$ on the light emitting surface corresponding to four point light sources A, B, C and D which constitute a convex quadrilateral which has the smallest area and the shortest circumference length among the plurality of point light sources are observed in a specific region W in a region surrounded by positions $A_0$, $B_0$, $C_0$ and $D_0$ which are positions of the projected image of the point light sources A, B, C and D on the light diffusing plate.

9 Claims, 11 Drawing Sheets

DIRECT-TYPE BACKLIGHT DEVICE

TECHNICAL FIELD

The present invention relates to a direct-type backlight device, and particularly relates to a direct-type backlight device which is provided with a plurality of point light sources and has a greatly reduced luminance unevenness on a illuminating surface.

BACKGROUND ART

Conventionally, as an example of a commonly used backlight device for liquid crystal displays, there is known a direct-type backlight device which is provided, in this order, with a reflecting plate, a plurality of linear light sources (e.g., cold cathode tubes) arranged in approximately parallel, and a light diffusing plate acting as a illuminating surface by diffusing and then emitting direct light from these linear light sources and reflected light on the reflecting plate. On the illuminating surface of such a direct-type backlight device, there is a tendency that the position right above the linear light source has high luminance, and the luminance becomes lower as leaving from the right-above position, which sometimes causes the periodic luminance unevenness.

Thus, for example, Patent Document 1 (JP Hei-6-273760-A) discloses a technique for relatively increase the light quantity irradiating the part between the linear light sources by printing a light quantity correcting pattern in a form of stripes or dots on the light diffusing plate to thereby reduce the light quantity irradiated to the region right above the linear light source. However, in this method, an availability of the light quantity irradiated from the linear light source is reduced and the sufficient luminance is not obtained because a part of the light quantity is blocked by the light quantity correcting pattern.

In recent years, a point light source such as LEDs (light emitting diodes) has been also utilized in place of the linear light source such as cold cathode tubes because such a point light source can give a sufficient luminance with reduced electric power consumption. However, even if the point light source is used as the light source of the direct-type backlight device, there still was a problem of the luminance unevenness occurring on the illuminating surface as was in the prior art. Addressing thereto, for example, Patent Document 2 (Utility Model Registration No. 3114467) discloses provision of a reflecting plate, a plurality of point light sources and a light diffusing plate, wherein prism-shaped light guide pyramids are formed on both a light receiving surface and a light emitting surface of the light diffusing plate, aiming at reducing the luminance unevenness on the illuminating surface by this light guide pyramids.

DISCLOSURE OF INVENTION

Problem to be Solved by the Invention

However, Patent Document 2 merely disclose provision of the light guide pyramids on both surfaces of the light diffusing plate, but is silent about reducing the luminance unevenness at greater level. Thus, with the method of Patent Document 2, there still remain problems of insufficient reduction of the luminance unevenness on the illuminating surface.

It is an object of the present invention to provide a direct-type backlight device having a greatly reduced luminance unevenness on the illuminating surface.

Means for Solving Problem

As a result of an extensive study for solving the aforementioned problem, the present inventors have found that the luminance unevenness on a illuminating surface can be greatly reduced by providing an image forming position adjusting member which produces, on a specific region of the light emitting surface of a light diffusing plate, images of each point light source corresponding to four point light sources which has selected so as to constitute a convex quadrilateral having the smallest area and the shortest circumference length among a plurality of point light sources, and have completed the present invention based on this finding.

That is, according to the present invention, the following direct-type backlight devices are provided.

(A) A direct-type backlight device comprising: a reflecting plate; a plurality of point light sources; and a light diffusing plate which receives direct light from said point light sources and reflected light from said reflecting plate on a light receiving surface thereof, and then diffuses and emits the light from a light emitting surface thereof, the reflecting plate, the point light sources and the light diffusing plate being placed in this order, wherein: at least either one of the reflecting plate and the light diffusing plate is provided with an image forming position adjusting member which produces images $A_1$, $B_1$, $C_1$ and $D_1$ of the point light sources A, B, C and D, respectively, on the light emitting surface, the four point light sources A, B, C and D being selected among the plurality of point light sources such that the four point light sources constitute a convex quadrilateral which has the smallest area and the shortest circumference length, and the images $A_1$, $B_1$, $C_1$ and $D_1$ being observed within a specific region which satisfies the following relationships (1) to (4) in a region surrounded by positions $A_0$, $B_0$, $C_0$ and $D_0$ which are positions of the projected image of the point light sources A, B, C and D on the light diffusing plate:

$$0.8 \times L(A_0C_0) > L(A_0A_1) > 0.2 \times L(A_0C_0) \quad (1)$$

$$0.8 \times L(A_0C_0) > L(C_0C_1) > 0.2 \times L(A_0C_0) \quad (2)$$

$$0.8 \times L(B_0D_0) > L(B_0B_1) > 0.2 \times L(B_0D_0) \quad (3)$$

$$0.8 \times L(B_0D_0) > L(D_0D_1) > 0.2 \times L(B_0D_0) \quad (4);$$

wherein L(XY) indicates a length of a line segment XY.

As referred to herein, the "image of the point light source" means an image of the point light source which is produced upon observation of the light emitting surface from the light emitting side, the image being observed at a position away from a position on the light diffusing plate right above the point light source (a position of the projected image of the point light source on the light diffusing plate: original position of the point light source) by the effect of the reflecting plate and the light diffusing plate (the image may be sometimes referred to herein as a "split image"). When a clear image of the point light source can not be observed, the position having a high luminance when measured by a luminance meter is regarded as the position of the split image. Generally, one point light source gives two or more split images. In order to confirm which point light source delivers which split image, one of the point light sources may be masked to find out which split image becomes unrecognizable upon observation from the light emitting side of the light diffusing plate. When one point light source gives a plurality of split images, the aforementioned relationships has to be satisfied for all of these split images. This requirement of the present invention may be satisfied if the aforementioned relationships are established for at least a part of all of possible convex quadrilaterals.

When a distance between the point light sources is measured, a standard position of the point light source is a central position of the point light source. That is, for selecting four point light sources A, B, C and D which constitute the convex quadrilateral having the smallest area and the shortest circumference length, the central position of each point light source may be regarded as the basis for selection.

When $L(A_0A_1)$, $L(B_0B_1)$, $L(C_0C_1)$ and $L(D_0D_1)$ do not satisfy the aforementioned relationships (1) to (4), there occurs a defect that the position of the split image appears too close to the position right above the point light source, which results in the luminance unevenness on the illuminating surface. However, when the position of the split image and the position right above the point light source satisfy the aforementioned relationships (1) to (4), the split image is observed in an intermediate region between the point light sources, and thus, the sufficient luminance is obtained on not only the position right above the point light source but also the intermediate region. Thus, the luminance unevenness on the illuminating surface can be further reduced.

The image forming position adjusting member may be provided on the light diffusing plate alone, the reflecting plate alone, or both of the light diffusing plate and reflecting plate.

(B) The direct-type backlight device wherein the shortest distance LP between two images selected from the images $A_1$, $B_1$, $C_1$ and $D_1$ satisfies the following relationships (5) and (6):

$$L(A_0C_0) \times 0.5 \geq LP \geq L(A_0C_0) \times 0.1 \quad (5)$$

$$L(B_0D_0) \times 0.5 \geq LP \geq L(B_0D_0) \times 0.1 \quad (6)$$

When the distance LP between the split images satisfies the aforementioned relationships (5) and (6), the luminance unevenness on the illuminating surface can be further reduced. The standard position of the split image is the central position of the split image (position having the highest luminance). That is, the distance LP between the split images is the length of the line segment connecting the central positions of the split images.

(C) The direct-type backlight device wherein the image forming position adjusting member is a fine concavo-convex structure formed on the light receiving surface and/or the light emitting surface, the fine concavo-convex structure being a structure of a plurality of pyramids having at least three planes which are aligned along a predetermined direction (certain one direction or a plurality of directions crossing one another).

By providing the surface of the light diffusing plate with the fine concavo-convex structure, the light emitted from the point light source is refracted on the surface of the fine concavo-convex structure, and the light emitted from the position other than the position right above the point light source goes along the direction of the thickness of the light diffusing plate. Thus, the split images are observed at the preferably dispersed positions with appropriate intervals. Therefore, the luminance unevenness on the illuminating surface can be greatly reduced.

(D) The direct-type backlight device wherein the fine concavo-convex structure is formed on the light emitting surface.

(E) The direct-type backlight device wherein: the light diffusing plate is in a shape approximate to a rectangle when viewed planarly, the plurality of point light sources are arranged along a lengthwise direction and a crosswise direction of the light diffusing plate with a predetermined interval, and the plurality of pyramids are aligned along a predetermined direction intersecting with the lengthwise direction and the crosswise direction.

(F) The direct-type backlight device wherein a front luminance of an image corresponding to the point light source at a position corresponding to an outer edge of the point light source is 15 to 100% relative to the maximum value of the front luminance in the image, wherein the front luminance is a luminance observed from a normal line direction of the light diffusing plate.

As used herein, the outer edge of the point light source refers to an outer edge of a light emitting portion of the point light source. For example, when the point light source is composed of a light emitting part, a non-transparent housing which masks the light emitting part and a transparent part where the light from the light emitting part emits in front of the housing, the outer edge is an outer edge of the transparent part.

(G) The direct-type backlight device wherein, in the image, a luminance observed from a direction inclined by 15° with respect to a normal line direction of the light diffusing plate when measured at a position having a maximum front luminance is 20% or more and less than 100% relative to the front luminance which is the luminance observed from the normal line direction.

(H) The direct-type backlight device wherein a mean line average roughness Ra of planes which compose the concavo-convex structure is $3 \, \mu m \geq Ra \geq 0.05 \, \mu m$ when a haze of the light diffusing plate is less than 20%, and is $2 \, \mu m \geq Ra \geq 0.0001 \, \mu m$ when the haze of the light diffusing plate is 20% or more and 100% or less.

(I) The direct-type backlight device wherein the image forming position adjusting member is the concavo-convex structure formed on the reflecting plate.

EFFECT OF THE INVENTION

According to the direct-type backlight device of the present invention, by providing with a split image forming member which produces the image of the point light source which is observed within the specific region, it is possible to greatly reduce the luminance unevenness on the illuminating surface. Also by using the plurality of point light sources, it is possible to increase the luminance observed from the front direction with reducing the electric power consumption compared with the case of using the linear light source.

BEST MODE FOR CARRYING OUT THE INVENTION

A direct-type backlight device according to one embodiment of the present invention will be described with reference to the drawings.

Figure 1:
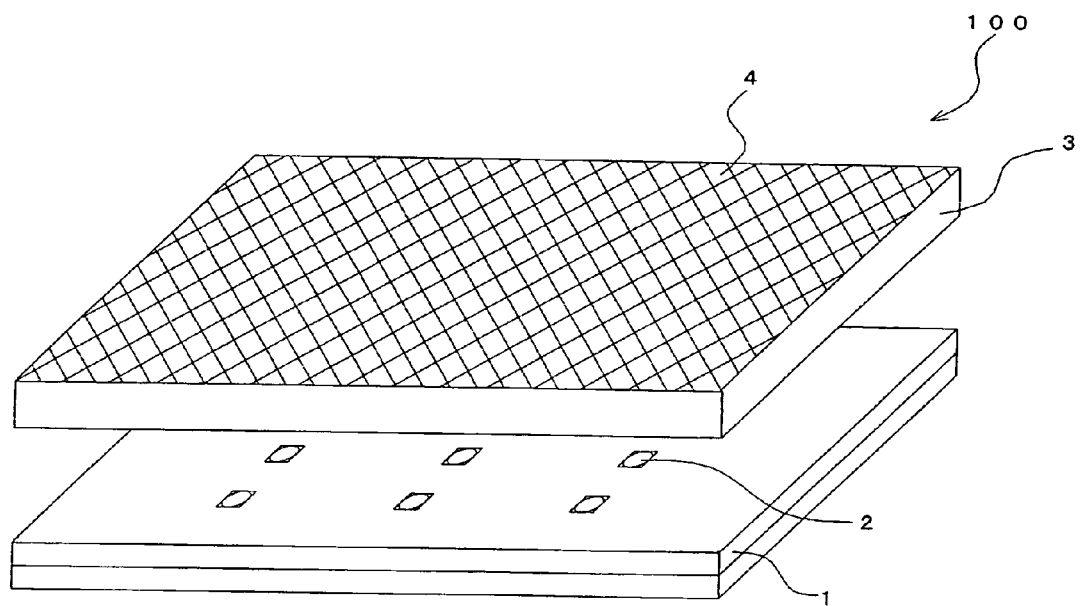
FIG. 1 is a perspective view schematically showing a direct-type backlight device according to an embodiment of the present invention.

FIG. 1 is a perspective view schematically showing the direct-type backlight device 100 according to the present embodiment. As shown in FIG. 1, the direct-type backlight device 100 has, in this order, a reflecting plate 1, a plurality of point light sources 2 and a light diffusing plate 3 which diffuses direct light from the point light sources 2 and reflected light from the reflecting plate 1 and then emits the light therefrom.

Resins colored in white or silver and metals may be used as materials of the reflecting plate 1, and the resin is preferable in terms of its light weight. The color of the reflecting plate 1 is preferably white in terms of being capable of reducing the luminance unevenness, i.e., enhancing a uniformity ratio of luminance, although white and silver may be mixed for highly balancing the luminance and the uniformity ratio of luminance.

As each point light source 2, for example, a light emitting diode (LED) may be used. Examples of the combination of the LEDs may include (I) a combination of white LEDs alone, (II) a combination of RGB three primary colors and (III) a combination of an intermediate color(s) with the RGB three primary colors. More specific examples of the combination of the RGB three primary colors (combinations (II) and (III)) may include (i) a combination in which at least one each of red, green and blue LEDs are closely arranged for mixing the colors to emit the white light, and (ii) a combination for color display using a field sequential method in which the red, green and blue LEDs are appropriately arranged, and the LEDs in each color are lit in a time-sharing manner. When LEDs of a variety of colors are closely arranged to form one set in the aforementioned constitution (i), the central position of each set is regarded as the central position of the point light source, and such central positions should be considered as the basis for satisfying the relationships (1) to (4). In the case of the aforementioned constitution (ii), each color LED should satisfy the relationships (1) to (4).

In the present embodiment, the constitution (I) is employed. That is, a plurality of white LEDs are aligned. Arrangement of the point light sources 2 with respect to the reflecting plate 1 and the light diffusing plate 2 may be in the following manner.

Figure 2:
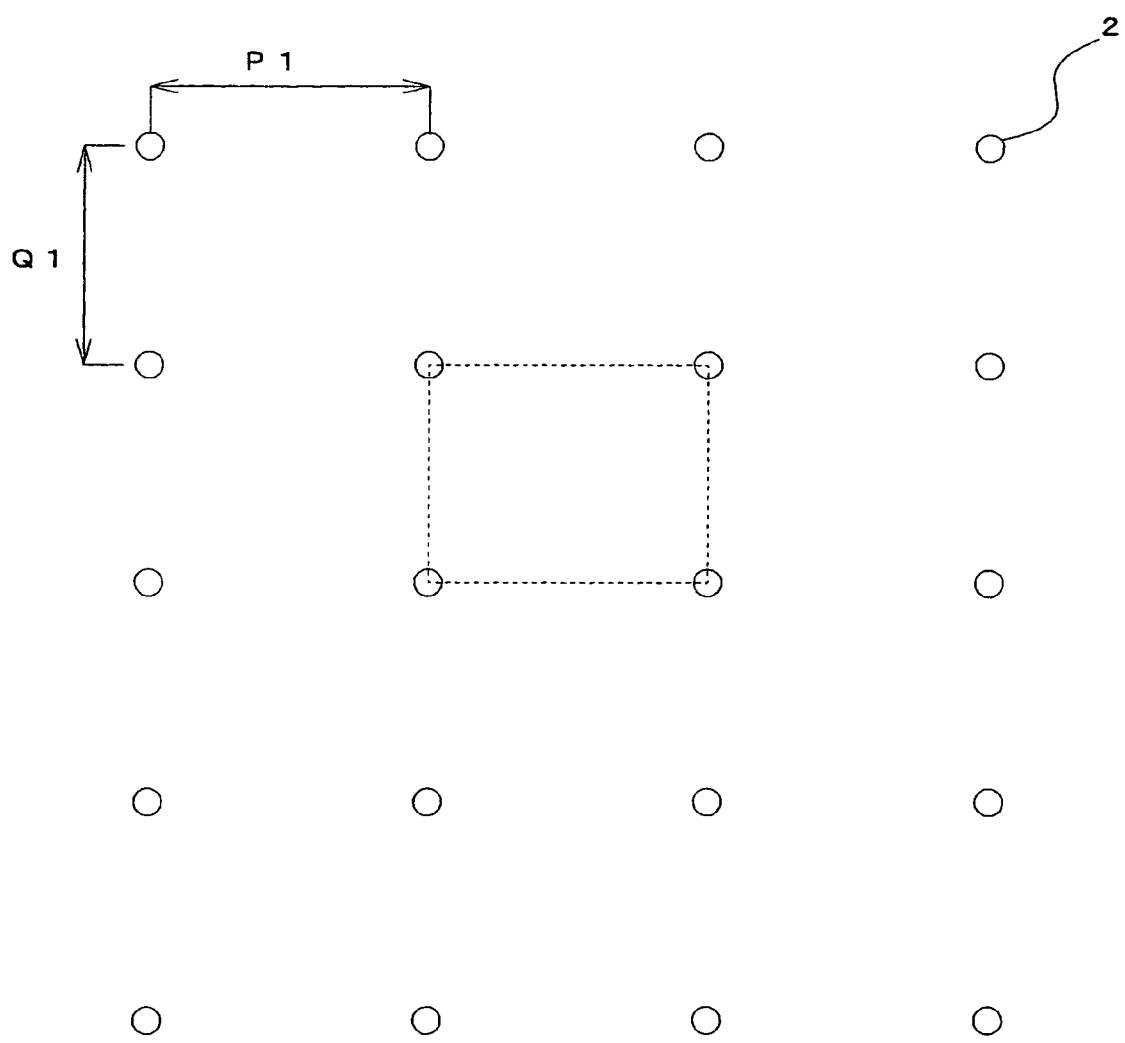
FIG. 2 is a plain view schematically showing an example of an arrangement for a plurality of point light sources.
Figure 3:
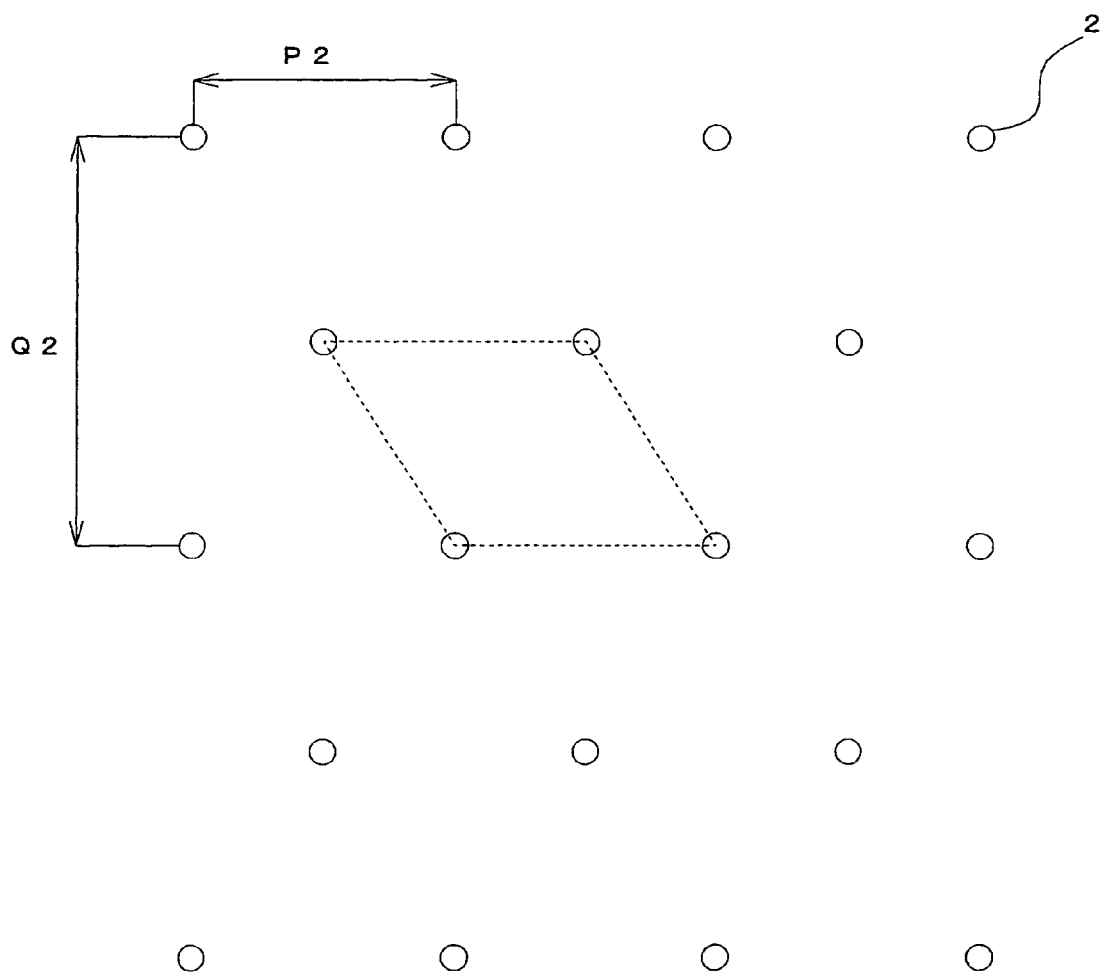
FIG. 3 is a plain view schematically showing an example of an arrangement for a plurality of point light sources.

FIG. 2 and FIG. 3 are plain views each schematically showing an example of arranging a plurality of the point light sources 2. As shown in FIG. 2, in the first example of arranging a plurality of the point light sources 2, the point light sources may be arranged along a lengthwise direction and a crosswise direction with a given interval on the light diffusing plate which is in a shape approximate to a rectangle (this pattern is referred to herein as a grid pattern). In FIG. 2, the vertical direction of the drawing is the lengthwise direction of the light diffusing plate, and the horizontal direction is the crosswise direction of the light diffusing plate. As shown in FIG. 3, in the second example of arranging a plurality of the point light sources 2, the point light sources 2 may be arranged at four corners of a rectangle and intersection points of diagonals of this rectangle (this pattern is referred to herein as a diagonal grid pattern).

In the present embodiment, the arrangement of the first example shown in FIG. 1 is employed, but the arrangement of the point light sources is not limited to the first and second examples.

The distance between the centers of adjacent two point light sources 2 is preferably 15 to 150 mm and more preferably 20 to 100 mm. By adjusting the distance within the aforementioned range, the electric power consumption of the direct-type backlight device may be reduced, an assembly of the device may become easy, and the luminance unevenness on the illuminating surface may be reduced.

The "adjacent two point light sources" are the two point light sources having the closest positional relationship, i.e., no other point light source is present on a line segment which connects the centers of the two point light sources. For example, in the grid alignment of the first example shown in FIG. 2, the distance between the centers of the adjacent point light sources is the distance P1 or Q1 between the point light sources along the lengthwise direction or the crosswise direction. In this example, the distances between the centers of the adjacent point light sources may be uniform in the entire area or may be partially different. The partial difference may be, for example, the difference of the distance between the point light sources which becomes closer at the central position of the direct-type backlight device. In the diagonal grid alignment of the second example in FIG. 3, the distance between the centers of the adjacent point light sources is the distance P2 or Q2 between the point light sources along the lengthwise direction or the crosswise direction.

In the present embodiment, the grid arrangement shown in FIG. 2 employs a tetragonal grid arrangement in which the lengths of P1 and Q1 are equal.

The light diffusing plate 3 is a plate material in a shape approximate to a rectangle when viewed planarly, having a light receiving surface to which the light enters and a light emitting surface from which diffused light goes out. The material for composing the light diffusing plate 3 may be glasses, a mixture of two or more resins which do not have tendency to be compatible with each other, a material obtained by dispersing a light diffusing agent in a transparent resin, and one or more sort of transparent resin. Among them, the resin is preferable because it has light and high moldability. One or more sort of transparent resin is preferable in terms of good ability to improve luminance, whereas the material obtained by dispersing the light diffusing agent in the transparent resin is preferable in terms of good adjustability of total light transmittance and haze.

The transparent resin refers to a resin having the total light transmittance of 70% or more when a plate made of the resin having smooth front and back surfaces and a thickness of 2 mm, in accordance with JIS K7361-1. Examples of the transparent resin may include polyethylene, propylene-ethylene copolymers, polypropylene, polystyrene, copolymers of an aromatic vinyl monomer and (meth)acrylate alkyl ester having a lower alkyl group, polyethylene terephthalate, terephthalic acid-ethylene glycol-cyclohexane dimethanol copolymers, polycarbonate, acrylic resins and resins having an alicyclic structure.

Herein "(meth)acrylic acid" refers to acrylic acid and methacrylic acid.

Among them, the resins having a water absorption ratio of 0.25% or less, e.g., polycarbonate, polystyrene, copolymers of an aromatic vinyl monomer and (meth)acrylate alkyl ester having the lower alkyl group, containing 10% or more aromatic vinyl monomer, and the resin having the alicyclic structure are preferable as the transparent resin because they are less likely deformed due to moisture absorption and thus the light diffusing plate having a large size and less warp may be obtained.

The resin having the alicyclic structure is particularly preferable because of good in fluidity which enables efficient production of the large size of light diffusing plate 3. The mixture of the resin having the alicyclic structure and the light diffusing agent may be suitably used because it has well-balanced high transmittance and high diffusibility required for the light diffusing plate 3 and has a good chromaticity.

The resin having the alicyclic structure is a resin having the alicyclic structure in a main chain and/or a side chain. The resin containing the alicyclic structure in the main chain is particularly preferable in terms of mechanical strength and heat resistance. Examples of the alicyclic structure may include a saturated cyclic hydrocarbon (cycloalkane) structure and an unsaturated cyclic hydrocarbon (cycloalkene, cycloalkine) structure. The cycloalkane structure and the cycloalkene structure are preferable and the cycloalkane structure is especially preferable in terms of mechanical strength and heat resistance. It is preferable that the alicyclic structure usually has 4 to 30 carbon atoms, preferably 5 to 20 carbon atoms and more preferably 5 to 15 carbon atoms. Within this range, the mechanical strength, the heat resistance and a moldability of the light diffusing plate 3 are highly balanced, thus being preferable.

The ratio of the repeating unit having the alicyclic structure in the resin having the alicyclic structure may be appropriately selected depending on the purpose, and is usually 50% by weight or more, preferably 70% by weight or more and more preferably 90% by weight or more. When the ratio of the repeating unit having the alicyclic structure is too low, the heat resistance is reduced, which is not preferable. Repeating units other than the repeating unit having the alicyclic structure in the resin having the alicyclic structure are appropriately selected depending on the purpose.

Specific examples of the resin having the alicyclic structure may include (1) norbornene polymers such as a ring-opening polymer of norbornene monomers, a ring-opening copolymer of the norbornene monomer and another monomer which is ring-opening copolymerizable therewith, hydrogenated products thereof, an addition polymer of the norbornene monomers, and an addition copolymer of the norbornene monomer and another monomer which is copolymerizable therewith; (2) monocyclic olefin polymers and hydrogenated products thereof; (3) cyclic conjugated diene polymers and hydrogenated products thereof; and (4) vinyl alicyclic hydrocarbon polymers such as a polymer of vinyl alicyclic hydrocarbon monomers, a copolymer of the vinyl alicyclic hydrocarbon monomer and another monomer which is copolymerizable therewith, hydrogenated products thereof, a polymer of vinyl aromatic monomers whose aromatic rings are hydrogenated, and a copolymer of the vinyl aromatic monomer and another monomer which is copolymerizable therewith whose aromatic rings are hydrogenated.

Among them, preferable in terms of heat resistance and mechanical strength are the norbornene polymer and the vinyl alicyclic hydrocarbon polymer, and more preferable are the hydrogenated ring-opening polymer of the norbornene monomers, hydrogenated copolymer of the norbornene monomer and another monomer which is ring-opening polymerizable therewith, the polymer of the vinyl aromatic monomer whose aromatic rings are hydrogenated, and the copolymer of the vinyl aromatic monomer and another monomer which is copolymerizable therewith whose aromatic rings are hydrogenated.

The light diffusing agent is a particle having a nature to diffuse a light ray and is broadly divided into an inorganic filler and an organic filler. Examples of the inorganic filler may include silica, aluminium hydroxide, aluminium oxide, titanium oxide, zinc oxide, barium sulfate, magnesium silicate and mixtures thereof. Examples of the organic filler may include acrylic resins, polyurethane, polyvinyl chloride, polystyrene resins, polyacrylonitrile, polyamide, polysiloxane resins, melamine resins and benzoguanamine resins. Among them, as the organic filler, fine particles composed of the polystyrene resin, the polysiloxane resin and crosslinked products thereof are preferable in terms of high diffusibility, high heat resistance and no coloration (yellowing) upon molding. Among them, the fine particle composed of the crosslinked product of the polysiloxane resin is more preferable in terms of more excellent heat resistance.

Examples of a shape of the light diffusing agent may include spherical, cubic, needle, bar, spindle, plate, scale and fibrous shapes, and among them, the spherical shape is preferable because diffusing directions of the light thereby may be isotropic. The light diffusing agent is uniformly dispersed in the transparent resin for use.

The ratio of the light diffusing agent dispersed in the transparent resin may be appropriately selected depending on the thickness of the light diffusing plate and the interval between the linear light sources, and is usually adjusted so that the total light transmittance of the dispersed product is preferably 60 to 98% and more preferably 65 to 95%. By adjusting the total light transmittance within the aforementioned range, it is possible to further enhance the luminance and the uniformity ratio of luminance. The total light transmittance is a value obtained by measuring a plate having smooth front and back surfaces and thickness of 2 mm in accordance with JIS K7361-1. The haze is a value obtained by measuring a plate having smooth front and back surfaces and thickness of 2 mm in accordance with JIS K7136.

The thickness of the light diffusing plate 3 is preferably 0.4 to 5 mm and more preferably 0.8 to 4 mm. By adjusting the thickness of the light diffusing plate 3 within the aforementioned suitable range, it is possible to reduce a flexure due to the plate's own weight, and to enable easy molding.

Subsequently, an outer shape of the light diffusing plate 3 will be described.

As shown in FIG. 1, in the direct-type backlight device 100, a fine concavo-convex structure 4 as the image forming position adjusting member is formed on the light emitting surface of the light diffusing plate 3, and the light receiving surface of the light diffusing plate 3 is a flat plane which is approximately flat. In FIG. 1, the fine concavo-convex structure 4 is illustrated in a schematic manner.

Figure 4:
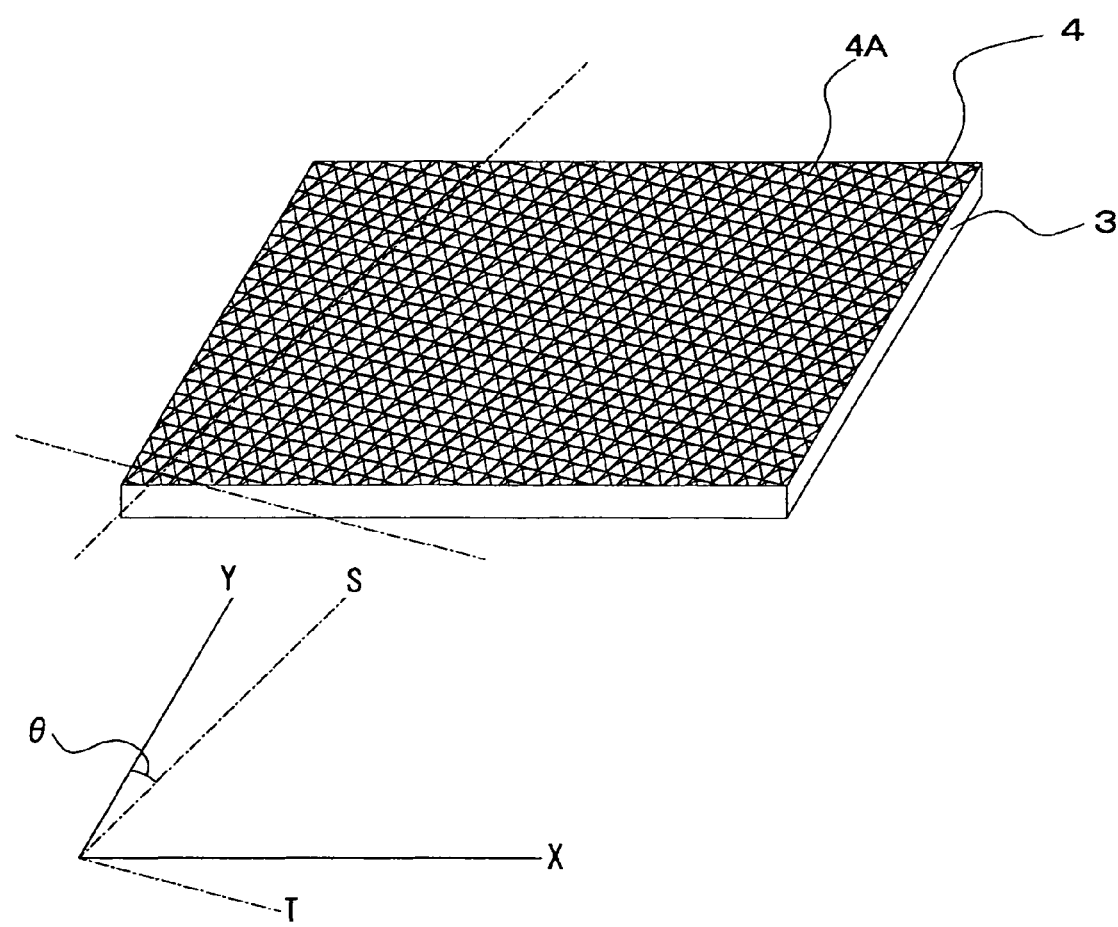
FIG. 4 is a schematic view for illustrating a fine concavo-convex structure on a light diffusing plate.

The fine concavo-convex structure 4 may be in a form of a plurality of concaved structures or convexed structures which constitute repeating units. The concaved or convexed structure in the present embodiment is a convexed shape quadrangular pyramid 4A as a pyramid having at least three planes as shown in FIG. 4. These quadrangular pyramids 4A are aligned along two directions which are the S direction which is one direction and the T direction which is another direction orthogonal to the S direction. In terms of improving the luminance unevenness, the quadrangular pyramids 4A are periodically aligned along the directions different from a transverse direction and a longitudinal direction (the vertical direction Y and the horizontal direction X in FIG. 4) of the light diffusing plate 3, and their alignment direction intersects with the vertical direction Y and the horizontal direction X. The pitch of this periodical cycle is preferably 20 to 700 μm and more preferably 30 to 400 μm. An angle θ (angle less than 90 degree, torsion angle) made by the alignment direction of the quadrangular pyramid 4A and the transverse direction of the light diffusing plate 3 (alignment direction of the point light sources) is preferably 15 to 75 degrees. An apex angle of the quadrangular pyramid 4A is preferably 30 to 150 degrees. The apex angle is the angle appearing on a cross-section of the quadrangular pyramid, wherein the cross-section gives the smallest angle among all possible cross-sections including the apex.

Because of high moldability, the fine concavo-convex structure having such convexed quadrangular pyramids 4A may be obtained by preparing a plate light diffusing plate, forming prismatic ridges composed of a plurality of linear prisms having a triangle section aligned in approximately parallel on the surface of this light diffusing plate, and giving a V-shaped incision along the direction orthogonal to the longitudinal direction of the liner prism.

Figure 5:
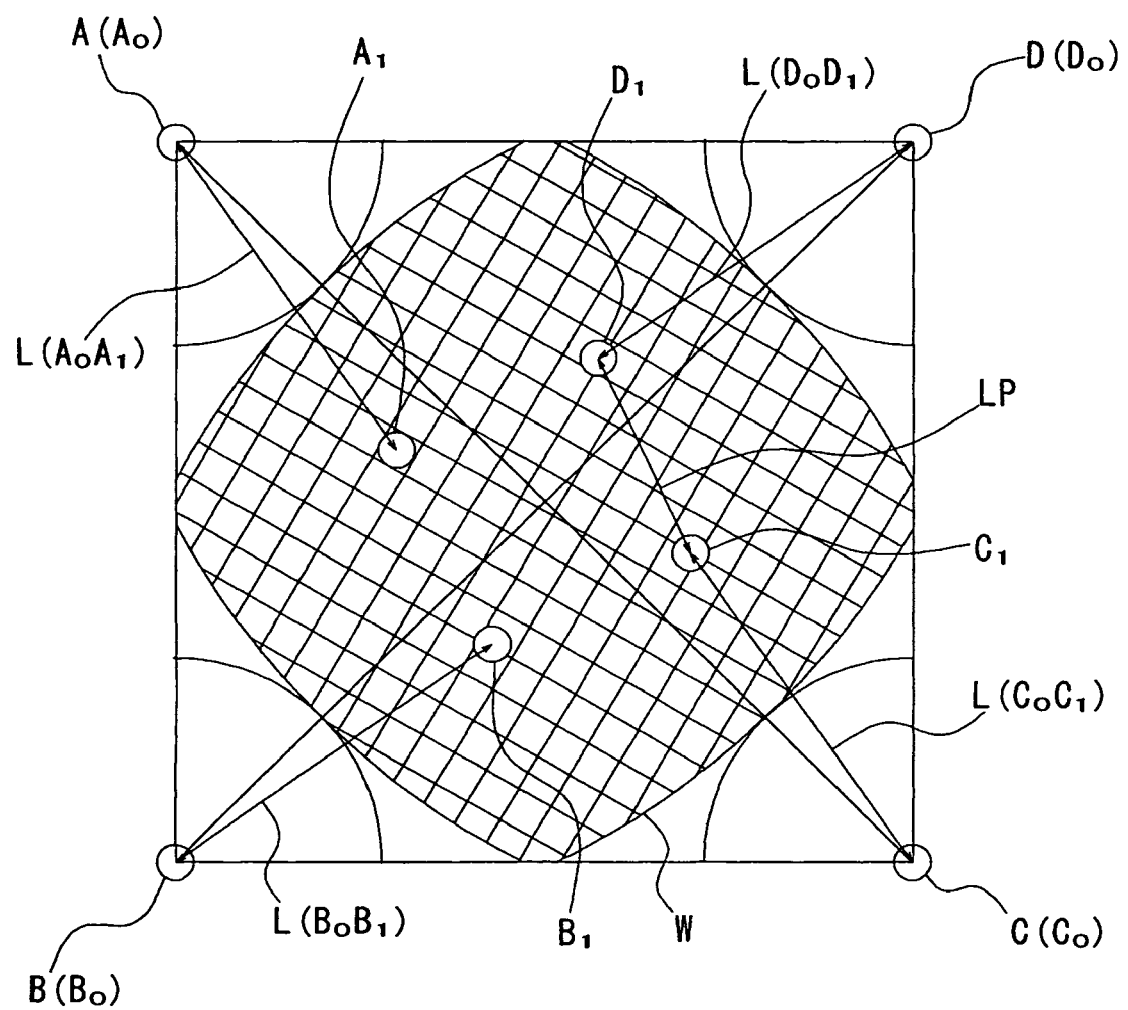
FIG. 5 is a schematic view for illustrating original positions of a plurality of point light sources and each position of a split image for each point light source.

Subsequently, a state when the direct-type backlight device 100 according to the present embodiment is observed from the light emitting side will be described. FIG. 5 is a schematic view for illustrating the original positions (projected positions) of the plurality of point light sources and the positions of the split images of the point light sources on the light diffusing plate (illuminating surface; light emitting surface).

The following discussion is on the case of, as shown in FIG. 5, four point light sources, A, B, C and D which constitute the convex quadrilateral which has the smallest area and the shortest circumference length selected from the plurality of point light sources in the direct-type backlight device. The convex quadrilateral is a square. Two diagonal lines of this convex quadrilateral are referred to as AC and BD.

When this convex quadrilateral is observed from the light emitting side, the images $A_1$, $B_1$, $C_1$ and $D_1$ on the light emitting surface corresponding to the point light sources A, B, C and D are observed within the specific region in the region surrounded by positions $A_0$, $B_0$ $C_0$ and $D_0$ which are positions of the projected image of the point light sources A, B, C and D on the light diffusing plate. The present inventors sought for the location for this specific region which minimizes the luminance unevenness. As a result, it has been found out that preferable location is as described below. Since the image forming position adjusting member is the quadrangular pyramid 4A, a plurality of the images are formed for one point light source. However, it is only necessary that one of the images satisfies the aforementioned conditions in this case.

As to the point light source A, the distance $L(A_0A_1)$ between the position of the image $A_1$ of the point light source A and the position $A_0$ right above the point light source A satisfies the following relationship with the length of the diagonal line $L(A_0C_0)$ on the light diffusing plate.

$$0.8 \times L(A_0C_0) > L(A_0A_1) > 0.2 \times L(A_0C_0) \tag{1}$$

As to the point light source C, the distance $L(C_0C_1)$ between the position of the image $C_1$ of the point light source C and the position $C_0$ right above the point light source C satisfies the following relationship with the length of the diagonal line $L(A_0C_0)$ on the light diffusing plate.

$$0.8 \times L(A_0C_0) > L(C_0C_1) > 0.2 \times L(A_0C_0) \tag{2}$$

As to the point light source B, the distance $L(B_0B_1)$ between the position of the image $B_1$ of the point light source B and the position $B_0$ right above the point light source B satisfies the following relationship with the length of the diagonal line $L(B_0D_0)$ on the light diffusing plate.

$$0.8 \times L(B_0D_0) > L(B_0B_1) > 0.2 \times L(B_0D_0) \tag{3}$$

As to the point light source D, the distance $L(D_0D_1)$ between the position of the image $D_1$ of the point light source D and the position $D_0$ right above the point light source D satisfies the following relationship with the length of the diagonal line $L(B_0D_0)$ on the light diffusing plate.

$$0.8 \times L(B_0D_0) > L(D_0D_1) > 0.2 \times L(B_0D_0) \tag{4}$$

Therefore, as shown in FIG. 5, the images $A_1$, $B_1$, $C_1$ and $D_1$ of the point light sources A, B, C and D are observed within the specific region W represented by slant lines in FIG. 5. These images $A_1$, $B_1$, $C_1$ and $D_1$ are observed within W, whereby the luminance unevenness on the illuminating surface may be greatly reduced.

In this case, it is preferable that the shortest distance LP between the images $A_1$, $B_1$, $C_1$ and $D_1$ satisfies the following relationships (5) and (6). The distance between the split images is kept at an appropriate interval thereby, which enables further reduction of the luminance unevenness on the illuminating surface.

$$L(A_0C_0) \times 0.5 \geq LP \geq L(A_0C_0) \times 0.1 \tag{5}$$

$$L(B_0D_0) \times 0.5 \geq LP \geq L(B_0D_0) \times 0.1 \tag{6}$$

According to the direct-type backlight device of the present embodiment, the split images are observed in the specific region by the fine concavo-convex structure which is the split image forming member. Thus, the luminance unevenness on the illuminating surface can be greatly reduced. In addition, by using the point light source, sufficient luminance may be obtained with reducing the electric power consumption.

In the present invention, a height of the concavo-convex structure is not particularly limited, but it is preferable that the maximum Ra(max) is 3 to 1,000 μm in the mean line average roughness Ra measured along various directions in the plane provided with the concavo-convex structure.

Figure 9:
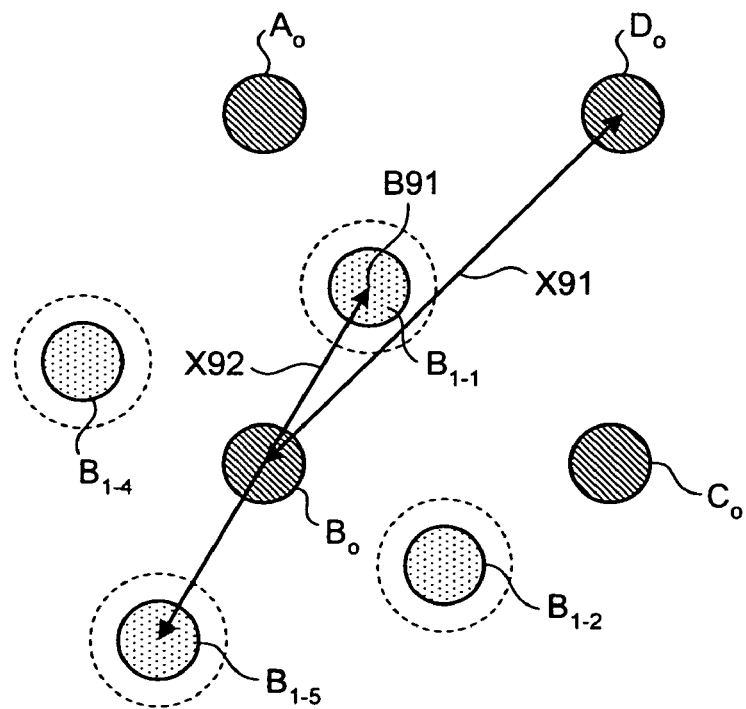
FIG. 9 is a schematic view for illustrating the positions of a plurality of point light sources and the positions of a plurality of split images of the point light sources.

In the direct-type backlight device of the present invention, it is preferable that the split image forming member forms the larger split image than the point light source. This will be specifically described using as an example the embodiment described in FIG. 5 and further with reference to FIG. 9. As a result of passage of the light from the point light sources A, B, C and D through the light diffusing plate 3 having the aforementioned convexed quadrangular pyramid 4A, refraction by the four inclined planes of the quadrangular pyramid 4A occurs, whereby each of the point light sources A, B, C and D generates corresponding four split images. Among all of those images, illustrated in FIG. 5 are only the split images $A_1$, $B_1$, $C_1$ and $D_1$ which appeared inside the quadrilateral ABCD, whereas illustrated in FIG. 9 are only those corresponding to the point light source B, i.e., four split images $B_{1-1}$, $B_{1-2}$, $B_{1-3}$ and $B_{1-4}$, for the sake of convenience. A solid line circle in the split images $B_{1-1}$, $B_{1-2}$, $B_{1-3}$ and $B_{1-4}$ has the same size as the point light source B.

If the split image is expanded to the size of a dashed line circle which is larger than the solid line circle, the luminance unevenness can be even further reduced. However, the direct-type backlight device of the present invention is not limited to the aforementioned embodiment, and may preferably include the case where the split image becomes indefinite due to the light diffusion by the light diffusing plate.

The front luminance of the image corresponding to the point light source as the luminance observed from the normal line direction of the light diffusing plate at the position corresponding to the outer edge of the point light source is 15 to 100% relative to the maximum value of the front luminance in the image. In other words, if the planar view of the point light source and the image corresponding to this point light source were hypothetically overlapped with their centers being matched, the front luminance of the image as the luminance observed from the normal line direction of the light diffusing plate at the outer edge of the point light source would be 15 to 100% relative to the maximum value of the front luminance. The maximum value of the front luminance is usually obtained at the central position of the image. "If the image and the point light source were hypothetically overlapped with their centers being matched" does not mean that they must be overlapped in the actual backlight device, but means that the size of the outer edge of the point light source and the size of the image are compared with their centers being matched.

In the direct-type backlight device of the present invention, it is preferable that the luminance observed from the direction inclined by 15° with respect to the normal line direction of the light diffusing plate and measured at the position on which the split image has the highest front luminance is 20% or more and less than 100% relative to the front luminance. Specifically, in the split image $B_{1-1}$ described in FIG. 9, the position having the highest front luminance is usually a central point B91 of the image $B_{1-1}$. The graph in FIG. 8 is obtained when the luminance is measured at this point B91 as the angle is changed along a certain direction on the plane, for evaluating an outgoing light angle property of the luminance.

Figure 8:
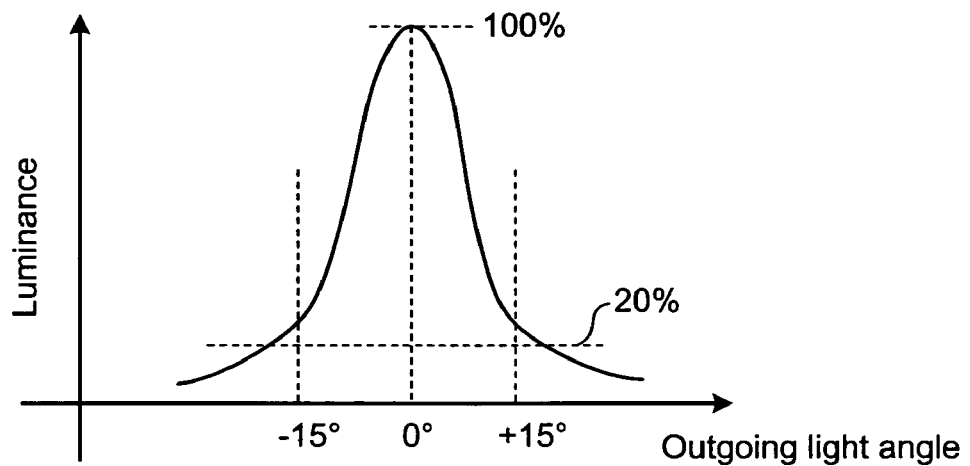
FIG. 8 is a graph illustrating a preferable property of the split image.

In FIG. 8, the horizontal axis represents an outgoing light angle in which the front direction is 0°. The vertical axis represents the luminance measured at the angle. As shown in FIG. 8, when the luminance at the angle of ±15° is 20% or more and less than 100% relative to the front luminance being 100%, the luminance unevenness can be reduced at even greater extent.

The light diffusing plate having such a preferable outgoing light angle property as the above may be obtained, for example, by appropriately adjusting a type and a content ratio of the diffusing agent in the light diffusing plate, or by appropriately adjusting the surface roughness of the light receiving surface and/or the light emitting surface of the light diffusing plate. In particular, it is particularly preferable that the mean line average roughness Ra of the plane which composes the concavo-convex structure is 3 µm≧Ra≧0.05 µm when the haze of the light diffusing plate is less than 20% and is 2 µm≧Ra≧0.0001 µm when the haze of the light diffusing plate is 20% or more and 100% or less. In the case of the aforementioned quadrangular pyramid 4A as an example, the "mean line average roughness of the plane which composes the concavo-convex structure" is the mean line average roughness in the plane which composes the quadrangular pyramid.

In the direct-type backlight device of the present invention, it is preferable that two or more split images corresponding to one point light source are generated on the light emitting surface, and that the distance X2 between the images maximally separated among the two or more images and the distance X1 between the light sources maximally separated among four light sources which constitute the convex quadrilateral have the relationship X1≧X2. This feature will be described referring to FIG. 9 again. In the convex quadrilateral ABCD in the example in FIG. 9, the longest light source pitch is X91, whereas the pitch of the images maximally separated in the four split images $B_{1-1}$, $B_{1-2}$, $B_{1-3}$ and $B_{1-4}$ corresponding to the light source B is X92. By making X91≧X92, it is possible to even greatly reduce the luminance unevenness.

Modified Embodiments

The present invention is not limited to the aforementioned embodiments.

In the aforementioned embodiments, the quadrangular pyramid is employed as the fine concavo-convex structure, but without limiting thereto, pyramids such as a triangular pyramid, a pentangular pyramid and a hexagonal pyramid may also be employed. In this case, the pyramids may be formed in the same manner as in the above changing a number and the direction of the V-shaped incision and a sectional shape of the prismatic ridges. For example, the triangular pyramids may be formed by giving two V-shaped incisions along the direction orthogonal to the prismatic ridges.

Although the convexed structure was employed as the fine concavo-convex structure in the aforementioned embodiments, the concaved structure may also be employed. Furthermore, a combination of the convexed structure and the concaved structure may also be employed. The fine concavo-convex structure having a plurality of the concaved pyramids may be obtained, for example, by forming a transfer member such as a stamper having the convexed pyramid in a similar manner to the formation of the convexed pyramid, and then transferring this convexed transfer member.

Although all of the quadrangular pyramids have the same size and the same outer shape in the aforementioned embodiments, a combination of the quadrangular pyramids having different sizes and outer shapes may also be employed. Although the fine concavo-convex structure, i.e. the split image forming member, is formed on the light emitting surface of the light diffusing plate 3 in the aforementioned embodiments, the structure may also be formed on the light receiving surface or on both surfaces. In summary, it is only necessary that the fine concavo-convex structure is formed on at least one surface of the light diffusing plate 3.

Although the fine concavo-convex structure, i.e. the split image forming member, is formed on the light diffusing plate 3 in the aforementioned embodiments, a fine concavo-convex structure similar to those formed on the light diffusing plate 3 may alternatively be formed on the surface of the reflecting plate 1. Such a constitution may also result in the same effect as in the aforementioned embodiment.

Figure 7:
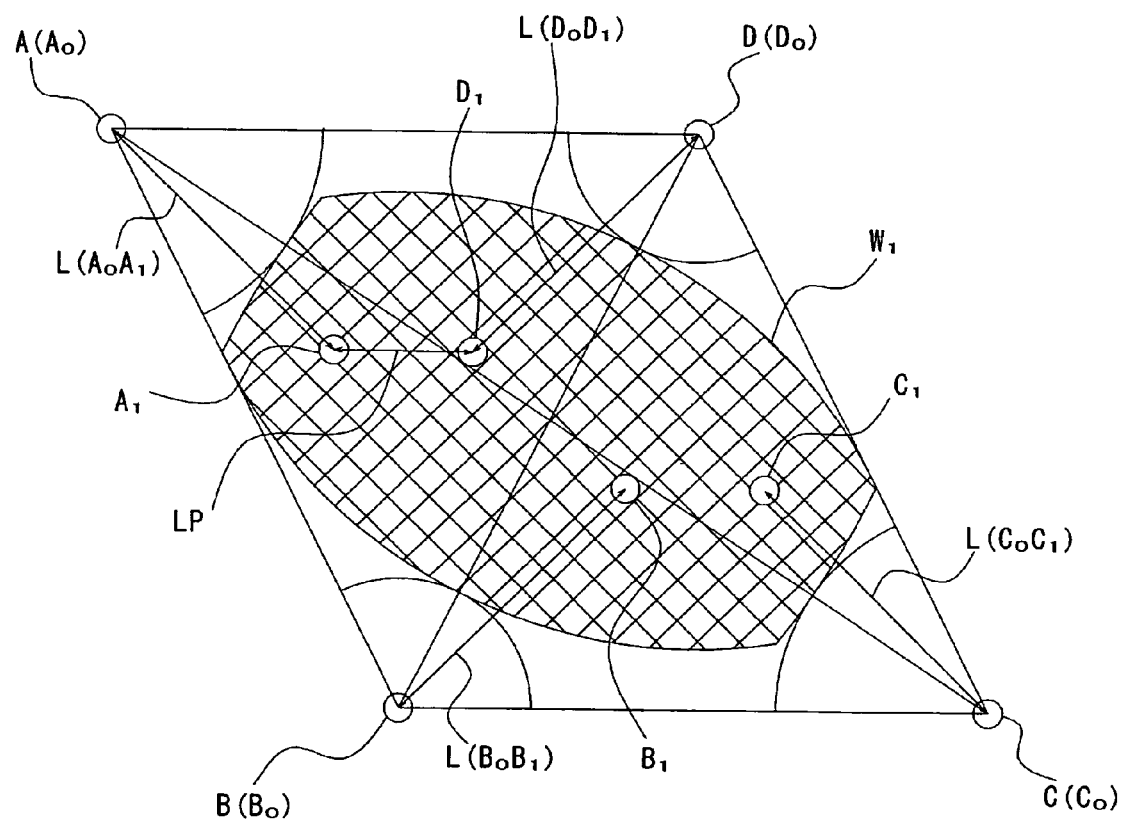
FIG. 7 is a schematic view for illustrating original positions of a plurality of point light sources and each position of a split image of each point light source.

The aforementioned embodiment is an embodiment of arranging the point light sources in the tetragonal grid pattern. In the following, arrangement of the point light sources in the diagonal grid pattern and the state of the light diffusing plate observed from the light emitting side will be described referring to FIG. 7. Now taken consideration is, as shown in FIG. 7, the case of selecting four point light sources, A, B, C and D which constitute a parallelogram which is the convex quadrilateral which has the smallest area and the shortest circumference length. Two diagonal lines of this convex quadrilateral are designated as AC and BD.

Observing such a parallelogram from the light emitting side, the images $A_1$, $B_1$, $C_1$ and $D_1$ on the light emitting surface corresponding to the point light sources A, B, C and D are observed within the specific region in the region surrounded by positions $A_0$, $B_0$ $C_0$ and $D_0$ which are the positions of the point light sources A, B, C and D projected on the light diffusing plate.

As to the point light source A, the distance $L(A_0A_1)$ between the position of the image $A_1$ of the point light source A and the position $A_0$ right above the point light source A satisfies the following relationship with the length of the diagonal line $L(A_0C_0)$ on the light diffusing plate.

$$0.8 \times L(A_0C_0) > L(A_0A_1) > 0.2 \times L(A_0C_0) \tag{1}$$

As to the point light source C, the distance $L(C_0C_1)$ between the position of the image $C_1$ of the point light source C and the position $C_0$ right above the point light source C satisfies the following relationship with the length of the diagonal line $L(A_0C_0)$ on the light diffusing plate.

$$0.8 \times L(A_0C_0) > L(C_0C_1) > 0.2 \times L(A_0C_0) \tag{2}$$

As to the point light source B, the distance $L(B_0B_1)$ between the position of the image $B_1$ of the point light source B and the position $B_0$ right above the point light source B satisfies the following relationship with the length of the diagonal line $L(B_0D_0)$ on the light diffusing plate.

$$0.8 \times L(B_0D_0) > L(B_0B_1) > 0.2 \times L(B_0D_0) \tag{3}$$

As to the point light source D, the distance $L(D_0D_1)$ between the position of the image $D_1$ of the point light source D and the position $D_0$ right above the point light source D satisfies the following relationship with the length of the diagonal line $L(B_0D_0)$ on the light diffusing plate.

$$0.8 \times L(B_0D_0) > L(D_0D_1) > 0.2 \times L(B_0D_0) \tag{4}$$

Therefore, as shown in FIG. 7, the images $A_1$, $B_1$, $C_1$ and $D_1$ are observed within the region $W_1$ represented by slant lines in FIG. 7, whereby the luminance unevenness on the illuminating surface may be greatly reduced.

In this case, it is preferable that the shortest distance between the images $A_1$, $B_1$, $C_1$ and $D_1$ satisfies the following relationships (5) and (6). The distance between the split images is kept with the appropriate interval thereby, which enables further reduction of the luminance unevenness on the illuminating surface.

$$L(A_0C_0) \times 0.5 \geq LP \geq L(A_0C_0) \times 0.1 \tag{5}$$

$$L(B_0D_0) \times 0.5 \geq LP \geq L(B_0D_0) \times 0.1 \tag{6}$$

Figure 10:
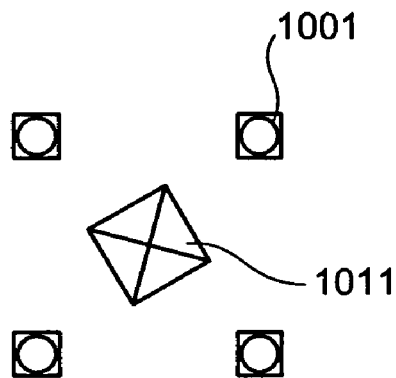
FIG. 10 is a plain view schematically showing an example of a relationship between a concavo-convex structure on a reflecting plate and the point light sources.
Figure 11:
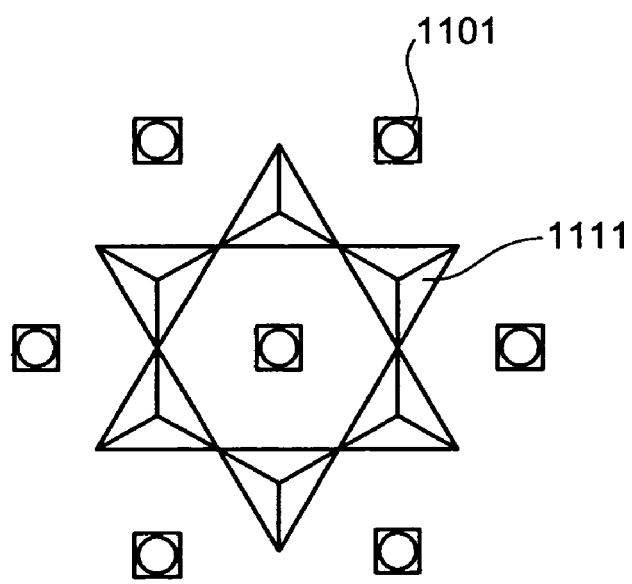
FIG. 11 is a plain view schematically showing another example of the relationship between the concavo-convex structure on the reflecting plate and the point light sources.
Figure 12:
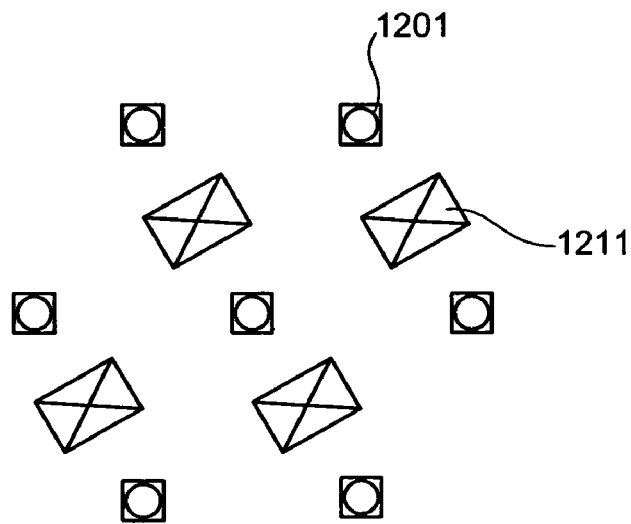
FIG. 12 is a plain view schematically showing another example of the relationship between the concavo-convex structure on the reflecting plate and the point light sources.

In the present invention, the image forming position adjusting member may alternatively be a concavo-convex structure on the reflecting plate. The shape of the concavo-convex structure on the reflecting plate is not particularly limited as long as the light emitted from the point light source is reflected toward the light diffusing plate, and is preferably a pyramid, a truncated pyramid, a cone or a hemisphere. In particular, it is more preferable that each concavo-convex structure is a pyramid or a truncated pyramid having planes facing the point light sources arranged in the circumference thereof. Such a preferable example gives even brighter split images and uniform front luminance of the backlight. Such a concavo-convex structure may be arranged in a position, for example, shown in FIGS. 10 to 12. Specifically, as shown in FIGS. 10 and 12, when four point light sources (1001, 1201) are arranged in the circumference of the concavo-convex structure (1011, 1211), the concavo-convex structure may be the quadrangular pyramid or a truncated quadrangular pyramid facing each point light source. Alternatively, as shown in FIG. 11, when three point light sources (1101) are arranged in the circumference of the concavo-convex structure (1111), the concavo-convex structure may be a triangular pyramid or a truncated triangular pyramid facing each point light source. This way, each concavo-convex structure may be appropriately selected depending on the arrangement of the point light sources.

In the concavo-convex structure formed on the reflecting plate, it is preferable that its top portion is present within an angle region (space) from the certain point light source in which the luminance is a half or more of the front luminance. Such a preferable example will be specifically described with reference to FIGS. 13 and 14.

Figure 13:
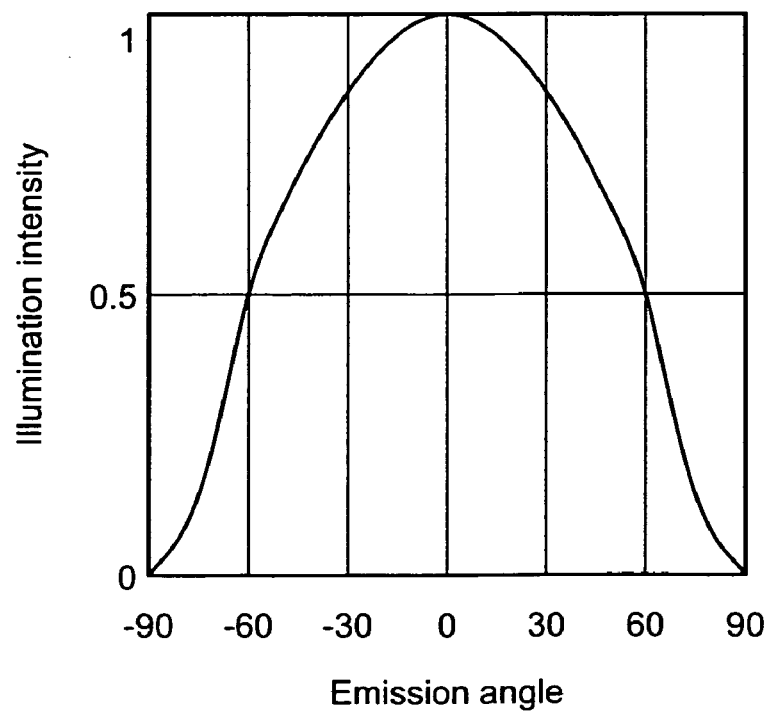
FIG. 13 is a graph showing a relationship between an emission angle and a relative illumination intensity of the point light source in the example of FIG. 14.
Figure 14:
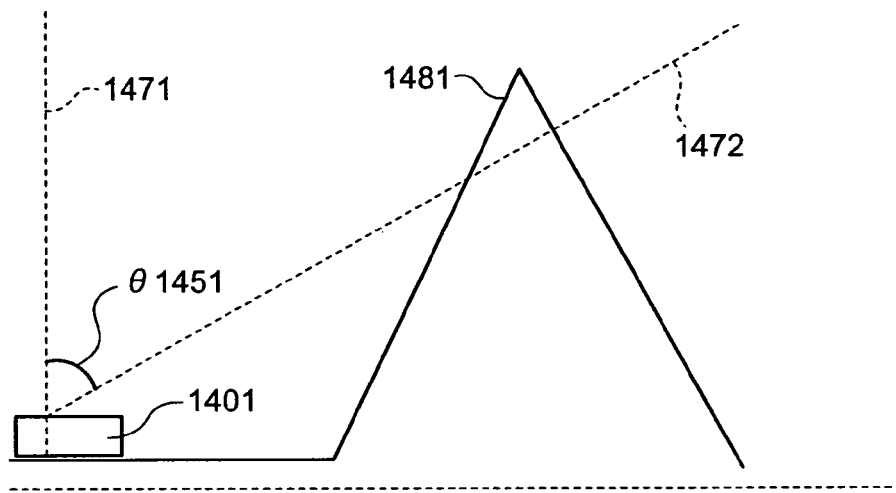
FIG. 14 is a vertical sectional view schematically showing a positional relationship between a top portion of the concavo-convex structure on the reflecting plate and the emission angle of the point light source.

FIG. 14 is a vertical sectional view for schematically illustrating a positional relationship of the top portion of the concavo-convex structure formed on the reflecting plate and the emission angle of the point light source, and FIG. 13 is a graph showing the relationship between the emission angle and the relative illumination intensity of the point light source (LED) (1401) used in the example in FIG. 14. In the graph in FIG. 13, the horizontal axis represents the emission angle of the point light source, i.e., the angle (represented by $\theta$ 1451 in FIG. 14) with respect to the direction 1471 perpendicular to the reflecting plate, and the vertical axis represents the illumination intensity at the emission angle represented as a relative value with respect to the illumination intensity at the angle of 0° being 1. As shown in FIG. 13, the luminance is a half or more of the front luminance in the range of the angle region −60° to +60° as to this point light source. In the case of using such a point light source, the aforementioned preferable conditions are satisfied if the angle $\theta$ 1451 made by the direction 1471 perpendicular to the reflecting plate and the line 1472 is 60° and the top portion 1481 of the concavo-convex structure is present within the space of an inverted cone shape obtained by rotating the line 1472 around the line 1471 as being the axis.

In the direct-type backlight device, other optical members may be appropriately disposed in the light emitting side of the light diffusing plate for the purpose of further enhancing the luminance and the uniformity ratio of luminance. Examples of such an optical member may include light diffusing sheets which diffuse and emit the incident light, prism sheets which adjust the direction of the emitting light, and reflective polarizers for the purpose of enhancing the luminance.

EXAMPLES

The present invention will be described in more detail with reference to the following Examples, but the present invention is not limited thereto. Parts and % are based on the weight unless otherwise specified.

Preparative Example 1

Pellet A for Light Diffusing Plate

Pellets A for a light diffusing plate were produced by mixing 99.7 parts of a resin having an alicyclic structure (ZEONOR 1060R, water absorption 0.01%, supplied from ZEON CORPORATION) as a transparent resin and 0.3 parts of fine particles composed of a crosslinked polysiloxane polymer having an average particle diameter of 2 μm as a light diffusing agent, kneading and extruding the mixture into strands using a biaxial extruder and cutting the strands using a pelletizer. A test plate of 100 mm×50 mm having smooth front and back surfaces and a thickness of 2 mm was molded using these pellets A for the light diffusing plate as a raw material and using an injection molding machine (mold clamping force 1000 kN: 102 ton). A total light transmittance and a haze of this test plate were measured in accordance with JIS K7361-1 and JIS K7136 using an integrating sphere mode color difference turbidity meter. The total light transmittance of the test plate was 89% and the haze thereof was 99%.

Preparative Example 2

Pellet B for Light Diffusing Plate

Pellets B for the light diffusing plate were produced in the same manner as in Preparative Example 1, except that the amount of the resin was 97.5 parts and the amount of the light diffusing agent was 2.5 parts. Using these pellets B for the light diffusing plate as the raw material, a test plate was prepared, and total light transmittance and haze thereof were measured in the same manner as in Preparative Example 1. The total light transmittance of the test plate was 55% and the haze thereof was 99%.

Preparative Example 3

Stamper 1

A nickel-phosphorus non-electrolytic plating of 100 μm thickness was formed on an entire surface of a stainless steel SUS430 (JIS G4305) having a size of 387 mm×308 mm×thickness of 100 mm. Using a monocrystal diamond cutting tool having an apex angle of 90 degrees, the nickel-phosphorus non-electrolytically plated surface was cut to form a plurality of triangle grooves having a pitch of 70 μm and an apex angle of 90 degrees. The grooves were formed along a direction having an angle of 30 degrees with respect to the direction of a side of 308 mm length (short side direction). Then, grooves having the same pitch were formed along the direction orthogonal to a longitudinal direction of the previously formed grooves using the same cutting tool. A stamper 1 having convexed structures of regular quadrangular pyramids on the nickel-phosphorus non-electrolytically plated surface was thus produced.

Preparative Example 4

Stamper 2

A stamper 2 was produced in the same manner as in Preparative Example 3 except using a monocrystal diamond cutting tool having the apex angle of 60 degrees.

Preparative Example 5

Stamper 3

Figure 6:
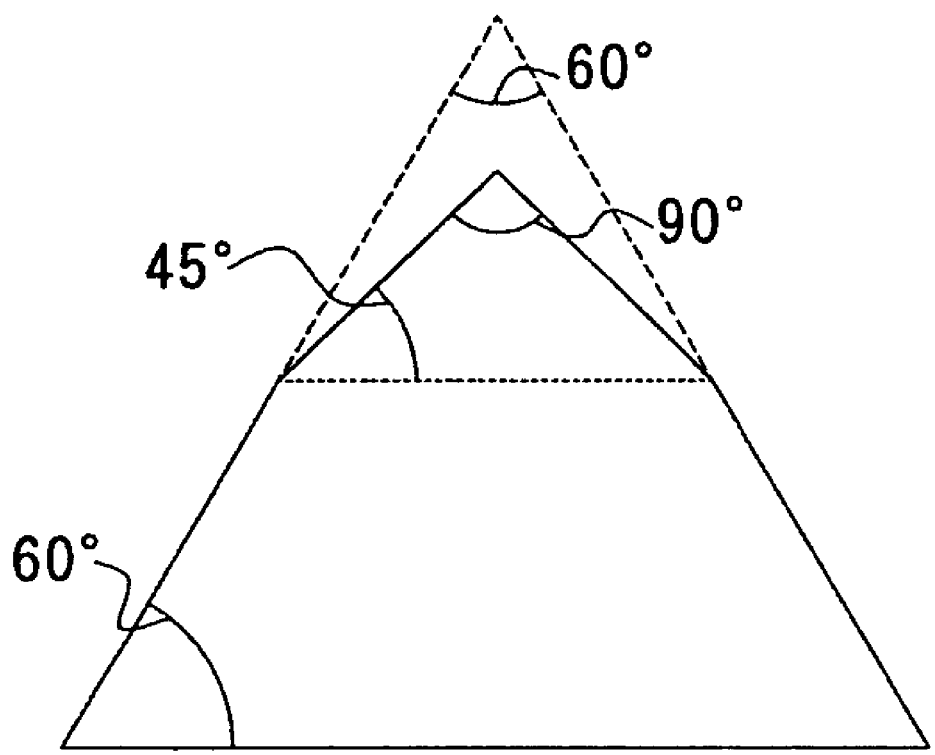
FIG. 6 is a sectional view of a diamond cutting tool used in Preparative Example 5.

A stamper 3 was produced in the same manner as in Preparative Example 3 except using a monocrystal diamond cutting tool having a multiangular cross-sectional shape as shown in FIG. 6.

Preparative Example 6

Stamper 4

A nickel-phosphorus non-electrolytic plating of 100 μm thickness was formed on an entire surface of a stainless steel SUS430 (JIS G4305) having a size of 387 mm×308 mm×thickness of 100 mm. Using a monocrystal diamond cutting tool having an apex angle of 90 degrees, the nickel-phosphorus non-electrolytically plated surface was cut to form a plurality of triangle grooves having a pitch of 70 μm and an apex angle of 90 degrees. The grooves were formed along a direction having an angle of 30 degrees (indicated as "30" in Table 1) with respect to a side of 308 mm length (short side direction). Then, the grooves having the same pitch were formed along the direction having an angle of 60 degrees (direction having an angle of 30 degrees with respect to the short side, wherein the angle is made to the opposite way to the aforementioned previously formed grooves: indicated as "–30" in Table 1) with respect to the longitudinal direction of the previously formed grooves using the same cutting tool. A stamper 4 having convexed structures of regular quadrangular pyramids on the nickel-phosphorus non-electrolytically plated surface was thus produced.

Preparative Example 7

Stamper 5

A stamper 5 was produced in the same manner as in Preparative Example 3 except using a monocrystal diamond cutting tool having the apex angle of 120 degrees.

Preparative Example 8

Stamper 6

A stamper 6 was produced in the same manner as in Preparative Example 3 except using a polycrystal diamond cutting tool having the apex angle of 90 degrees.

Preparative Example 9

Pellet C for Light Diffusing Plate

Pellets C for the light diffusing plate were produced in the same manner as in Preparative Example 1, except that the amount of the resin was 99.95 parts and the amount of the light diffusing agent was 0.05 parts. Using these pellets C for the light diffusing plate as the raw material, a test plate was prepared, and total light transmittance and haze thereof were measured in the same manner as in Preparative Example 1. The total light transmittance of the test plate was 93% and the haze thereof was 80%.

Preparative Example 10

Pellet D for Light Diffusing Plate

Pellets D for the light diffusing plate were produced in the same manner as in Preparative Example 1, except that the amount of the resin was 99.6 parts and the amount of the light diffusing agent was 0.4 parts. Using these pellets D for the light diffusing plate as the raw material, a test plate was prepared, and total light transmittance and haze thereof were measured in the same manner as in Preparative Example 1. The total light transmittance of the test plate was 81% and the haze thereof was 99%.

Preparative Example 11

Pellet E for Light Diffusing Plate

The aforementioned resin as it was without addition of the light diffusing agent was used for preparing pellets E for the light diffusing plate. Using these pellets E for the light diffusing plate as a raw material, a test plate was prepared, and total light transmittance and haze thereof were measured in the same manner as in Preparative Example 1. The total light transmittance of the test plate was 92% and the haze thereof was 0.5%.

Preparative Example 12

Stamper 7

A nickel-phosphorus non-electrolytic plating of 100 μm thickness was formed on an entire surface of a stainless steel SUS430 (JIS G4305) having the size of 387 mm×308 mm×thickness of 100 mm. Using a monocrystal diamond cutting tool having the apex angle of 100 degrees, the nickel-phosphorus non-electrolytically plated surface was cut to form a plurality of triangle grooves having a pitch of 70 μm and an apex angle of 100 degrees. The grooves were formed along a direction parallel to the side of 308 mm length (short side direction). A stamper 7 having linear convexed structures having a triangle cross-sectional shape on the nickel-phosphorus non-electrolytically plated surface was thus produced.

Example 1

An aluminium plate of 0.5 mm for heat release was put on a bottom of a milk-white plastic case having an inner size width of 305 mm, length of 227 mm and depth of 16 mm, and a reflecting sheet (E-60L supplied from Toray Industries, Inc.) was attached thereon to make a reflecting plate. Subsequently, white chip-type LEDs (NCCW002, size: 7.2×11.2×3.05 mm supplied from Nichia Corporation) which were point light sources were arranged on the reflecting plate at the bottom to configure a tetragonal grid pattern (example shown in FIG. 2) so that both lengthwise and crosswise distances between the centers were 25 mm (P1=Q1 in FIG. 2), and wires were connected for supplying direct current to electrode parts. In this example, in the square which is a convex quadrilateral composed of four LEDs, its diagonal lengths $L(A_0C_0)$ and $L(B_0D_0)$ were 35.4 mm.

Subsequently, a mold to which the stamper 1 obtained in Preparative Example 3 had been attached was prepared. Using this mold, the pellets A for the light diffusing plate obtained in Preparative Example 1, and an injection molding machine (mold clamping force 4,410 kN: 450 ton), a light diffusing plate having a transferred concaved surface shape of quadrangular pyramids and having a size of 237 mm×315 mm with the thickness of 2 mm was molded at a cylinder temperature of 280° C. and a mold temperature of 85° C.

The light diffusing plate was placed on the plastic case so that the surface having the concaved structure faced an opposite side to the LED (anti-light source position). A diffusing sheet (BS040 supplied from Kimoto Co., Ltd.) was further provided on the light diffusing plate. A prism sheet (BEF-III supplied from Sumitomo 3M Ltd.) was provided thereon so that the prisms are placed on a opposite side to the light diffusing plate and the prism ridge lines are in parallel with the 315 mm side. Further a reflective polarizer (DBEF-d400 supplied from Sumitomo 3M Ltd.) utilizing birefringence was placed thereon, to produce a direct-type backlight device.

Then, electricity at a voltage of 3.8 V and a current of 350 mA was applied to the produced direct-type backlight device, to cause LED illumination. The direct-type backlight device was then observed from a light emitting side of the light diffusing plate and split images of the LEDs were observed. The distance between the original position of the LED and the position of the split image of the LED ($L(A_0A_1)$, $L(B_0B_1)$, $L(C_0C_1)$ and $L(D_0D_1)$) was 9.9 mm, and the distance LP between the split images was 12.9 mm. Since the diagonal length $L(A_0C_0)=L(B_0D_0)=35.4$ mm, $L(A_0A_1)/L(A_0C_0)$ was 0.281 and $LP/L(A_0C_0)$ was 0.365. Thus, these satisfied the aforementioned relationships (1) to (6).

At the position having the highest front luminance in each split image (center of the split image), an outgoing light angle property distribution, which is the distribution of luminance at a varied observation angle relative to the front luminance, was measured using a color luminance meter. As a result, the luminance observed from the direction inclined by 15° with respect to the normal line direction of the light diffusing plate was 91% relative to the front luminance.

The front luminance at the position of the split image was measured using a two dimensional color distribution measurement apparatus, to find out the front luminance at the position which would be on an outer edge of the corresponding LED if the LED were overlapped with the split image with the centers thereof being matched. The luminance at that position was 81% relative to the maximum luminance, i.e., the luminance at the center of the split image.

As to the direct-type backlight device in which the lights were turned on, the luminance observed from the front direction was measured using the two dimensional color distribution measurement apparatus at 100 points with equal intervals on a center line along the transverse direction. The mean luminance La and the uniformity ratio of luminance Lu were obtained in accordance with the following mathematical formula 1 and mathematical formula 2. In this example, the mean luminance was 5,220 cd/cm$^2$ and the uniformity ratio of luminance was 1.30. As a result of visual observation of the direct-type backlight device from the front direction and an oblique direction, no luminance unevenness was recognized in any direction, and a display performance was excellent.

Mean luminance: $La=(L1+L2)/2$ (mathematical formula 1)

Uniformity ratio of luminance: $Lu=\{(L1-L2)/La\} \times 100$ (mathematical formula 2)

L1: Average of local maximum luminance values right above LED

L2: Average of local minimum values between local maximum values

The uniformity ratio of luminance is an indicator which exhibits the uniformity of luminance. The larger the number is, the poorer the uniformity of luminance is.

Example 2

A direct-type backlight device was produced and evaluated in the same manner as in Example 1, except using the stamper 2 obtained in Preparative Example 2. The direct-type backlight device was observed from the light emitting side of the light diffusing plate, and the split images of LEDs were observed. The distance between the original position of the LED and the position of the split image of this LED ($L(A_0A_1)$, $L(B_0B_1)$, $L(C_0C_1)$ and $L(D_0D_1)$) was 16.7 mm, and the distance LP between the split images was 6.9 mm. Since the diagonal length $L(A_0C_0)=L(B_0D_0)=35.4$ mm, $L(A_0A_1)/L(A_0C_0)$ was 0.473 and $LP/L(A_0C_0)$ was 0.195. Thus, these satisfied the aforementioned relationships (1) to (6).

The luminance observed from the direction inclined by 15° with respect to the normal line direction of the light diffusing plate, which was measured at the position having the highest front luminance of the split image (center of the split image)

was 91% relative to the front luminance at the same position. The front luminance at the position of the split image was measured using the two dimensional color distribution measurement apparatus. The front luminance at the position which would be on an outer edge of the corresponding LED if the LED were overlapped with the split image with the centers thereof being matched was 84% relative to the maximum luminance which was the luminance in the center of the split image. The mean luminance was 5,130 cd/cm² and the uniformity ratio of luminance was 1.40. As a result of visual observation of the direct-type backlight device from the front direction and the oblique direction, faint luminance unevenness was recognized from the oblique direction. However, no luminance unevenness in the front direction was recognized, and the display performance was good.

Example 3

A direct-type backlight device was produced and evaluated in the same manner as in Example 1, except using the stamper 3 obtained in Preparative Example 5. This direct-type backlight device has prisms each of which has eight inclined planes, and thus, two split images per one direction were obtained for one LED. The direct-type backlight device was observed from the light emitting side of the light diffusing plate and split images of the LEDs were observed. The distance between the original position of the LED and the position of the first split image of this LED ($L(A_0A_1)$, $L(B_0B_1)$, $L(C_0C_1)$ and $L(D_0D_1)$) was 9.9 mm, and the distance LP between the split images was 12.9 mm. The distance between the original position of the LED and the position of the second split image of this LED ($L(A_0A_1)$, $L(B_0B_1)$, $L(C_0C_1)$ and $L(D_0D_1)$) was 16.7 mm, and the distance LP between the split images was 6.9 mm. Since the diagonal length $L(A_0C_0)$=$L(B_0D_0)$=35.4 mm, $L(A_0A_1)/L(A_0C_0)$ was 0.281 and $LP/L(A_0C_0)$ was 0.365 as to the first split images. As to the second split images, $L(A_0A_1)/L(A_0C_0)$ was 0.473 and $LP/L(A_0C_0)$ was 0.195. Thus, these satisfied the aforementioned relationships (1) to (6).

The luminance observed from the direction inclined by 15° with respect to the normal line direction of the light diffusing plate, which was measured at the position having the highest front luminance of the split image (center of the split image) was 91% relative to the front luminance at the same position. The front luminance at the position of the split image closer to the light source was measured using the two dimensional color distribution measurement apparatus. The front luminance at the position which would be on an outer edge of the corresponding LED if the LED were overlapped with the split image with the centers thereof being matched was 80% relative to the maximum luminance which was the luminance in the center of the split image. The front luminance similarly measured at the position of the split image more distant from the light source was 85% relative to the maximum luminance. The mean luminance was 5,150 cd/cm² and the uniformity ratio of luminance was 1.20. As a result of visual observation of the direct-type backlight device from the front direction and an oblique direction, no luminance unevenness was recognized in any direction, and a display performance was excellent.

Example 4

Chip type LEDs which are the same as the aforementioned ones were arranged in the diagonal grid pattern (example shown in FIG. 3) so that the distance between the centers was 50 mm in the longitudinal direction (Q2 in FIG. 3) and 25 mm in the transverse direction (P2 in FIG. 3) on the bottom reflecting plate obtained in the same manner as in Example 1. Wires were connected for supplying direct current to the electrode parts. In this example, in the parallelogram (surrounded by the dashed line in FIG. 3) which was the convex quadrilateral composed of four LEDs, its diagonal length $L(A_0C_0)$ was 45.1 mm and the diagonal length $L(B_0D_0)$ was 28.0 mm. Subsequently, the light diffusing plate was produced in a similar manner to Example 1 using the stamper 4 obtained in Preparative Example 6. This light diffusing plate was placed on the plastic case in the same manner as in Example 1. The diffusing sheet, prism sheet and reflective polarizer utilizing the birefringence were placed in this order in the same manner as the aforementioned, to produce a direct-type backlight device.

The direct-type backlight device was observed from the light emitting side of the light diffusing plate and split images of the LEDs were observed. As to the LEDs corresponding to both ends of the diagonal line of the diagonal length $L(A_0C_0)$ (45.1 mm), the distance between the original position of the LED and the position of the split image of this LED was 9.9 mm, and the distance LP between the split images was 8.1 mm. Since the diagonal length $L(A_0C_0)$ was 45.1 mm, $L(A_0A_1)/L(A_0C_0)$ was 0.220 and $LP/L(A_0C_0)$ was 0.180. Furthermore, as to the LEDs corresponding to both ends of the diagonal line of the diagonal length $L(B_0D_0)$ (28.0 mm), the distance between the original position of the LED and the position of the split image of this LED was 9.9 mm, and the distance LP between the split images was 8.2 mm. Since the diagonal length $L(B_0D_0)$ was 28.0 mm, $L(B_0B_1)/L(B_0D_0)$ was 0.356 and $LP/L(B_0D_0)$ was 0.293. Thus, these satisfied the aforementioned relationships (1) to (6).

The luminance observed from the direction inclined by 15° with respect to the normal line direction of the light diffusing plate, which was measured at the position having the highest front luminance of the split image (center of the split image) was 91% relative to the front luminance at the same position. The front luminance at the position of the split image was measured using the two dimensional color distribution measurement apparatus. The front luminance at the position which would be on an outer edge of the corresponding LED if the LED were overlapped with the split image with the centers thereof being matched was 80% relative to the maximum luminance which was the luminance in the center of the split image. The mean luminance was 5,090 cd/cm² and the uniformity ratio of luminance was 1.40. As a result of visual observation of the direct-type backlight device from the front direction and the oblique direction, faint luminance unevenness was recognized from the oblique direction. However, no luminance unevenness was recognized in the front direction, and the display performance was good.

Example 5

A direct-type backlight device was produced and evaluated in the same manner as in Example 4, except using the stamper 1 obtained in Preparative Example 3. The direct-type backlight device was observed from the light emitting side of the light diffusing plate, and the split images of LEDs were observed. As to the LEDs corresponding to both ends of the diagonal line of the diagonal length $L(A_0C_0)$ (45.1 mm), the distance between the original position of the LED and the position of the split image of this LED was 9.9 mm, and the distance LP between the split images was 11.9 mm. Since the diagonal length $L(A_0C_0)$ was 45.1 mm, $L(A_0A_1)/L(A_0C_0)$ was 0.220 and $LP/L(A_0C_0)$ was 0.265. Furthermore, as to the LEDs corresponding to both ends of the diagonal line of the diagonal length $L(B_0D_0)$ (28.0 mm), the distance between the original position of the LED and the position of the split image of this LED was 16.7 mm, and the distance LP between the split images was 11.9 mm. Since the diagonal length $L(B_0D_0)$ was 28.0 mm, $L(B_0B_1)/L(B_0D_0)$ was 0.599 and $LP/L(B_0D_0)$ was 0.427. Thus, these satisfied the aforementioned relationships (1) to (6).

The luminance observed from the direction inclined by 15° with respect to the normal line direction of the light diffusing plate, which was measured at the position having the highest front luminance of the split image (center of the split image) was 91% relative to the front luminance at the same position. The front luminance at the position of the split image was measured using the two dimensional color distribution measurement apparatus. The front luminance at the position which would be on an outer edge of the corresponding LED if the LED were overlapped with the split image with the centers thereof being matched was 80% relative to the maximum luminance which was the luminance in the center of the split image. The mean luminance was 5,160 cd/cm² and the uniformity ratio of luminance was 1.35. As a result of visual observation of the direct-type backlight device from the front direction and the oblique direction, faint luminance unevenness was recognized from the oblique direction. However, no luminance unevenness was recognized in the front direction, and the display performance was good.

Comparative Example 1

A direct-type backlight device was produced and evaluated in the same manner as in Example 1, except using the stamper 5 obtained in Preparative Example 7. The direct-type backlight device was observed from the light emitting side of the light diffusing plate, and the split images of LEDs were observed. The distance between the original position and the position of the split image of this LED was 5.8 mm, and the distance LP between the split images was 8.3 mm. Since the diagonal length $L(A_0C_0)=L(B_0D_0)$ was 35.4 mm, $L(A_0A_1)/L(A_0C_0)$ was 0.165 and $LP/L(A_0C_0)$ was 0.234. Thus these did not satisfy the aforementioned relationships (1) to (6). The luminance observed from the direction inclined by 15° with respect to the normal line direction of the light diffusing plate, which was measured at the position having the highest front luminance of the split image (center of the split image) was 91% relative to the front luminance at the same position. The front luminance at the position of the split image was measured using the two dimensional color distribution measurement apparatus. The front luminance at the position which would be on an outer edge of the corresponding LED if the LED were overlapped with the split image with the centers thereof being matched was 77% relative to the maximum luminance which was the luminance in the center of the split image.

The mean luminance was 5,250 cd/cm² and the uniformity ratio of luminance was 3.20. As a result of visual observation of the direct-type backlight device from the front direction, luminance unevenness was recognized and the display performance was poor.

Comparative Example 2

A direct-type backlight device was produced and evaluated in the same manner as in Example 1, except that the stamper was omitted to obtain a flat plate light diffusing plate using the pellets B for the light diffusing plate obtained in Preparative Example 2. The direct-type backlight device was observed from the light emitting side of the light diffusing plate, and no split image of the LED was found. The mean luminance was 4,950 cd/cm² and the uniformity ratio of luminance was 2.90. As a result of the visual observation of the direct-type backlight device from the front direction, luminance unevenness was recognized and the display performance was poor.

The constitutions and the results in Examples 1 to 5 and Comparative Examples 1 to 2 are shown in Table 1.

TABLE 1

| | | | | Ex. 3 | | Ex. 4 Apex 1 | Ex. 4 Apex 2 | Ex. 5 Apex 1 | Ex. 5 Apex 2 | Comp. Ex. 1 | Comp. Ex. 2 |
|---|---|---|---|---|---|---|---|---|---|---|---|
| | | Ex. 1 | Ex. 2 | 30° | −60° | | | | | | |
| Dispersant concentration (wt %) | | 0.3 | 0.3 | 0.3 | | 0.3 | | 0.3 | | 0.3 | 2.5 |
| S-direction prism | Apex angle (°) | 90 | 60 | 60, 90 | | 90 | | 90 | | 120 | NA |
| | Twist angle (°) | 30 | 30 | 30 | | 30 | | 30 | | 30 | NA |
| T-direction prism | Apex angle (°) | 90 | 60 | 60, 90 | | 90 | | 90 | | 120 | NA |
| | Twist angle (°) | −60 | −60 | −60 | | −30 | | −60 | | −60 | NA |
| Angle of ST | (°) | 90 | 90 | 90 | | 60 | | 90 | | 90 | NA |
| LED arrangement | | Tetragonal grid | Tetragonal grid | Tetragonal grid | | Diagonal grid | | Diagonal grid | | Tetragonal grid | Tetragonal grid |
| Grid distance (P1, P2, Q1, Q2) | | 25.0 | 25.0 | 25.0 | | 25.0, 50.0 | | 25.0, 50.0 | | 25.0 | 25.0 |
| Diagonal distance ($L(A_0C_0)$, $L(B_0D_0)$) | | 35.4 | 35.4 | 35.4 | 35.4 | 45.1 | 28.0 | 45.1 | 28.0 | 35.4 | 35.4 |
| Distance between LED projection position and sprit image ($L(A_0A_1)$, $L(B_0B_1)$, $L(C_0C_1)$, $L(D_0D_1)$) | | 9.9 | 16.7 | 9.9 | 16.7 | 9.9 | 9.9 | 9.9 | 16.7 | 5.8 | 0.0 |
| Distance between split images (LP) | | 12.9 | 6.9 | 12.9 | 6.9 | 8.1 | 8.2 | 11.9 | 11.9 | 8.3 | 0.0 |
| ($L(L(A_0A_1)$, $L(B_0B_1)$, $L(C_0C_1)$, $L(D_0D_1))/$ ($L(A_0C_0)$, $L(B_0D_0)$) | | 0.281 | 0.473 | 0.281 | 0.473 | 0.220 | 0.356 | 0.220 | 0.599 | 0.165 | 0.000 |
| $LP/(L(A_0C_0)$, $L(B_0D_0))$ | | 0.365 | 0.195 | 0.365 | 0.195 | 0.180 | 0.293 | 0.265 | 0.427 | 0.234 | 0.000 |
| 15° luminance ratio | % | 91 | 91 | 91 | | 91 | | 91 | | 91 | NA |

TABLE 1-continued

|  |  | Ex. 1 | Ex. 2 | Ex. 3 30° | Ex. 3 −60° | Ex. 4 Apex 1 | Ex. 4 Apex 2 | Ex. 5 Apex 1 | Ex. 5 Apex 2 | Comp. Ex. 1 | Comp. Ex. 2 |
|---|---|---|---|---|---|---|---|---|---|---|---|
| Outer edge luminance ratio | % | 81 | 84 | 85 |  | 80 |  | 80 |  | 77 | NA |
| Front luminance | cd/m² | 5.220 | 5.130 | 5.150 |  | 5.090 |  | 5.160 |  | 5.250 | 4.950 |
| Luminance unevenness | % | 1.30 | 1.40 | 1.20 |  | 1.40 |  | 1.35 |  | 3.20 | 2.90 |
| Visual observatory evaluation | — | very good | good | very good |  | good |  | good |  | bad | bad |

Each terms in Table 1 indicates the following.

15° Luminance ratio: ratio of the luminance observed from the direction inclined by 15° with respect to the normal line direction of the light diffusing plate at the position (center of split image) having the highest front luminance of the spirit image, relative to the front luminance.

Outer edge luminance ratio: ratio of the front luminance of the spirit image at the position which would be on an outer edge of the corresponding LED if the LED were overlapped with the split image with the centers thereof being matched, relative to the maximum luminance of the split image (luminance at the center of the split image).

As shown in Table 1, the uniformity ratio of luminance was high and the visual evaluation was good or very good in Examples 1 to 5. However, the uniformity ratio of luminance was low and the visual evaluation was poor in Comparative Examples 1 and 2.

Example 6

A direct-type backlight device was produced and evaluated in the same manner as in Example 1, except using the pellets C for the light diffusing plate obtained Preparative Example 9 and using a plastic case having an inner size width of 305 mm, length of 227 mm and depth of 20 mm.

The split images of the LEDs were observed. The distance between the original position of the LED and the position of the split image (L($A_0A_1$), L($B_0B_1$), L($C_0C_1$), L($D_0D_1$)) was 10.9 mm, and the distance LP between the split images was 11.5 mm. Since the diagonal length L ($A_0C_0$)=L($B_0D_0$)=35.4 mm, L($A_0A_1$)/L($A_0C_0$) was 0.308 and LP/L($A_0C_0$) was 0.326. Thus, these satisfied the aforementioned relationships (1) to (6).

Subsequently, the surface roughness of the light diffusing plate used was measured using a super-depth microscope. The surface roughness Ra(max) on the concaved pattern surface was 31.5 μm. The surface roughness Ra on the inclined plane in the concave quadrangle pyramid composing the pattern was 0.005 μm. The surface roughness Ra on a flat plane side having no pattern was 0.6 μm.

At the position having the highest front luminance in each split image (center of the split image), an outgoing light angle property distribution, which is the distribution of luminance at a varied observation angle relative to the front luminance, was measured using a view angle measurement apparatus (EzContrast supplied from Eldim). As a result, the luminance observed from the direction inclined by 15° with respect to the normal line direction of the light diffusing plate was 33% relative to the front luminance.

The front luminance at the position of the split image was measured using the two dimensional color distribution measurement apparatus. The front luminance at the position which would be on an outer edge of the corresponding LED if the LED were overlapped with the split image with the centers thereof being matched was 24% relative to the maximum luminance which was the luminance in the center of the split image.

As to the direct-type backlight device in which the lights were turned on, the luminance observed from the front direction was measured using the two dimensional color distribution measurement apparatus at 100 points with equal intervals on the center line along the transverse direction. The mean luminance La and the uniformity ratio of luminance Lu were obtained in accordance with the aforementioned mathematical formula 1 and mathematical formula 2. In this example, the mean luminance was 5,324 cd/cm² and the uniformity ratio of luminance was 1.00. As a result of visual observation of the direct-type backlight device from the front direction and the oblique direction, no luminance unevenness was recognized in any direction, and a display performance was excellent.

Example 7

A direct-type backlight device was produced and evaluated in the same manner as in Example 6, except using the pellets E for the light diffusing plate obtained in Preparative Example 11 in place of the pellets C for the light diffusing plate and using the stamper 6 obtained in Preparative Example 8.

The positions of the split images were the same as those in Example 6, and satisfied the aforementioned relationships (1) to (6).

Subsequently, the surface roughness of the light diffusing plate used was measured using the super-depth microscope. The surface roughness Ra(max) on the concaved pattern surface was 31.5 μm. The surface roughness Ra measured in the concave quadrangle pyramid composing the pattern along the direction which gives the steepest slope on the inclined plane was 0.15 μm. The surface roughness Ra on the flat plane side having no pattern was 0.6 μm.

At the position having the highest front luminance in each split image (center of the split image), an outgoing light angle property distribution, which is the distribution of luminance at a varied observation angle relative to the front luminance, was measured using a color luminance meter. As a result, the luminance observed from the direction inclined by 15° with respect to the normal line direction of the light diffusing plate was 25% relative to the front luminance. The front luminance at the position of the split image was measured using the two dimensional color distribution measurement apparatus. The front luminance at the position which would be on an outer edge of the corresponding LED if the LED were overlapped with the split image with the centers thereof being matched was 73% relative to the maximum luminance which was the luminance in the center of the split image.

The mean luminance was 5,351 cd/cm$^2$ and the uniformity ratio of luminance was 1.30. As a result of visual observation of the direct-type backlight device from the front direction and the oblique direction, faint luminance unevenness was recognized from the oblique direction. However, no luminance unevenness was recognized in the front direction, and the display performance was good.

Example 8

A light diffusing plate was made in the same manner as in Example 6 except that the pellets D for the light diffusing plate obtained in Preparative Example 10 were used in place of the pellets C for the light diffusing plate and the stamper 7 obtained in Preparative Example 12 was used in place of the stamper 1 obtained in Preparative Example 3. The surface roughness of this light diffusing plate was measured using the super depth microscope. The surface roughness Ra(max) on the concaved pattern surface was 26.4 μm. The surface roughness Ra on the inclined plane in the concave quadrangle pyramid composing the pattern was 0.01 μm. The surface roughness Ra on a flat plane side having no pattern was 0.6 μm.

A backlight device was produced and evaluated in the same manner as in Example 6, except that the LEDs were arranged in the tetragonal grid pattern with the pitch of 25 mm along the direction inclined by 45° from the short side of the plastic case.

The split images of the LEDs were observed. The distance between the original position of the LED and the position of the split image ($L(A_0A_1)$, $L(B_0B_1)$, $L(C_0C_1)$, $L(D_0D_1)$) was 9.2 mm, and the distance LP between the split images was 17.0 mm. Since the diagonal length $L(A_0C_0)=L(B_0D_0)=35.4$ mm, $L(A_0A_1)/L(A_0C_0)$ was 0.260 and $LP/L(A_0C_0)$ was 0.481. Thus, these satisfied the aforementioned relationships (1) to (6).

At the position having the highest front luminance in each split image (center of the split image), an outgoing light angle property distribution, which is the distribution of luminance at a varied observation angle relative to the front luminance, was measured using a color luminance meter. As a result, the luminance observed from the direction inclined by 15° with respect to the normal line direction of the light diffusing plate was 96% relative to the front luminance. The front luminance at the position of the split image was measured using the two dimensional color distribution measurement apparatus. The front luminance at the position which would be on an outer edge of the corresponding LED if the LED were overlapped with the split image with the centers thereof being matched was 97% relative to the maximum luminance which was the luminance in the center of the split image.

The mean luminance was 5,168 cd/cm$^2$ and the uniformity ratio of luminance was 1.45. As a result of visual observation of the direct-type backlight device from the front direction and the oblique direction, faint luminance unevenness was recognized from the oblique direction. However, no luminance unevenness was recognized in the front direction, and the display performance was good.

Example 9

Figure 15:
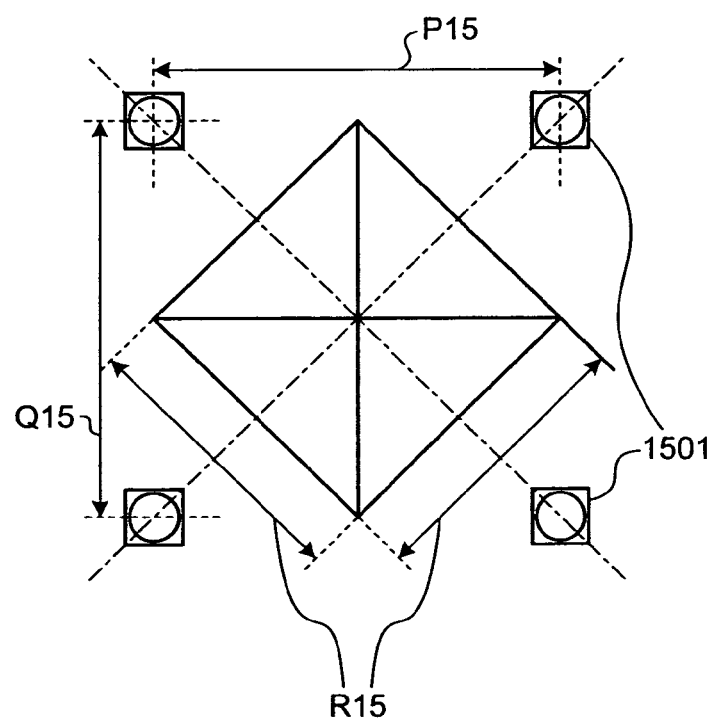
FIG. 15 is a plain view schematically showing a positional relationship between LED and a quadrangular pyramid-shaped reflecting sheet in Example 9.

On a wooden mold was formed a concaved portion of an inversed quadrangular pyramid having a bottom face in a form of a square having each side of 17.68 mm, and a height of 15.31 mm, and an apex located at the center when viewed planarly from the bottom face. At the bottom of the concaved portion, a hole having a diameter of 0.5 mm was opened. A reflecting sheet (188E20 supplied from Toray Industries, Inc.) was placed on this wooden mold and heated at 120° C. A vacuum was applied via the hole in the bottom to mold the reflecting sheet into a quadrangular pyramid shape. This reflecting sheet was placed as shown in FIG. 15 on a reflecting plate which is the same as the reflecting plate of Example 1 so that the apex of the quadrangular pyramid was located in the center of the tetragonal grid when viewed from the above. FIG. 15 is the plain view showing the positional relationship between the LEDs and the reflecting sheet having the shape of the quadrangular pyramid in this embodiment. In the example shown in FIG. 15, the distance between the grids of the LEDs 1501, P15 or Q15 was 25.00 mm, and a base side R15 of the quadrangular pyramid was 17.68 mm as described above. The quadrangular pyramid was placed so that the apex of this quadrangular pyramid was located at the center of the grid of LEDs 1501 and the base of the quadrangular pyramid made the angle of 45° with the tetragonal grid composed of the LEDs.

A backlight device was produced and evaluated in the same manner as in Example 1, except using the aforementioned backlight, the pellets B for the light diffusing plate obtained in Preparative Example 2 and the light diffusing plate having no pattern on both sides which had been formed without the stamper.

The split images of the LEDs, which were generated by the reflecting plate with the quadrangular pyramid were observed. The distance between the original position of the LED and the position of the split image ($L(A_0A_1)$, $L(B_0B_1)$, $L(C_0C_1)$, $L(D_0D_1)$) was 14.9 mm, and the distance LP between the split images was 3.8 mm. Since the diagonal length $L(A_0C_0)=L(B_0D_0)=35.4$ mm, $L(A_0A_1)/L(A_0C_0)$ was 0.421 and $LP/L(A_0C_0)$ was 0.107. Thus, these satisfied the aforementioned relationships (1) to (6).

At the position having the highest front luminance in each split image (center of the split image), an outgoing light angle property distribution, which is the distribution of luminance at a varied observation angle relative to the front luminance, was measured using a color luminance meter. As a result, the luminance observed from the direction inclined by 15° with respect to the normal line direction of the light diffusing plate was 98% relative to the front luminance.

As to the direct-type backlight device in which the lights were turned on, the luminance observed from the front direction was measured using the two dimensional color distribution measurement apparatus at 100 points with equal intervals on the center line along the transverse direction. The mean luminance La and the uniformity ratio of luminance Lu were obtained in accordance with the aforementioned mathematical formula 1 and mathematical formula 2. In this example, the mean luminance was 4,632 cd/cm$^2$ and the uniformity ratio of luminance was 1.80. As a result of visual observation of the direct-type backlight device from the front direction and the oblique direction, faint luminance unevenness was recognized from the oblique direction. However, no luminance unevenness was recognized in the front direction, and the display performance was good.

The constructions and the results in Examples 6 to 9 are shown in Table 2.

TABLE 2

|  |  | Ex. 6 | Ex. 7 | Ex. 8 | Ex. 9 |
|---|---|---|---|---|---|
| Dispersant concentration (wt %) |  | 0.05 | 0 | 0.4 | 2.5 |
| S-direction prism | Apex angle (°) | 90 | 90 | 100 | NA |
|  | Twist angle (°) | 30 | 30 | 0 | NA |
| T-direction prism | Apex angle (°) | 90 | 90 | — | NA |
|  | Twist angle (°) | −60 | −60 | — | NA |
| Angle of ST | (°) | 90 | 90 | — | NA |
| LED arrangement |  | Tetragonal grid | Tetragonal grid | Tetragonal grid (45° twist) | Tetragonal grid (with refractive plate protrusion |
| Grid distance (P1, P2, Q1, Q2) |  | 25.0 | 25.0 | 25.0 | 25.0 |
| Diagonal distance ($L(A_0C_0)$, $L(B_0D_0)$) |  | 35.4 | 35.4 | 35.4 | 35.4 |
| Distance between LED projection position and sprit image ($L(A_0A_1)$, $L(B_0B_1)$, $L(C_0C_1)$, $L(D_0D_1)$) |  | 10.9 | 10.9 | 9.2 | 14.9 |
| Distance between split images (LP) |  | 11.5 | 11.5 | 17.0 | 3.8 |
| ($L(A_0A_1)$, $L(B_0B_1)$, $L(C_0C_1)$, $L(D_0D_1)$)/ ($L(A_0C_0)$, $L(B_0D_0)$) |  | 0.308 | 0.308 | 0.260 | 0.421 |
| LP/($L(A_0C_0)$, $L(B_0D_0)$) |  | 0.326 | 0.326 | 0.481 | 0.107 |
| Ra (max) | μm | 31.5 | 31.5 | 26.4 | NA |
| Pattern surface Ra | μm | 0.005 | 0.15 | 0.01 | NA |
| Flat surface Ra | μm | 0.6 | 0.6 | 0.6 | NA |
| 15° luminance ratio | % | 33 | 25 | 96 | 98 |
| Outer edge luminance ratio | % | 24 | 73 | 97 | NA |
| Front luminance | cd/m² | 5.324 | 5.351 | 5.168 | 4.632 |
| Luminance unevenness | % | 1.00 | 1.30 | 1.45 | 1.80 |
| Visual observatory evaluation | — | very good | good | good | good |

The terms in Table 2 indicate the followings

Ra(max): surface roughness of the pattern having the concavo-convex surface (measured value of surface roughness including the concaves and convexes of the pattern).

Pattern surface Ra: surface roughness of the inclined plane on the concaves and convexes composing the pattern.

Flat surface Ra: surface roughness of the flat surface having no pattern.

15° Luminance ratio: ratio of the luminance observed from the direction inclined by 15° with respect to the normal line direction of the light diffusing plate at the position (center of split image) having the highest front luminance of the spirit image, relative to the front luminance.

Outer edge luminance ratio: ratio of the front luminance of the spirit image at the position which would be on an outer edge of the corresponding LED if the LED were overlapped with the split image with the centers thereof being matched, relative to the maximum luminance of the split image (luminance at the center of the split image).

The invention claimed is:

1. A direct-type backlight device comprising:
   a reflecting plate;
   a plurality of point light sources; and
   a light diffusing plate which receives direct light from said point light sources and reflected light from said reflecting plate on a light receiving surface thereof, and then diffuses and emits the light from a light emitting surface thereof,
   said reflecting plate, said point light sources and said light diffusing plate being placed in this order, wherein:
   at least either one of said reflecting plate and said light diffusing plate is provided with an image forming position adjusting member which produces images $A_1$, $B_1$, $C_1$ and $D_1$ of the point light sources A, B, C and D, respectively, on said light emitting surface,
   said four point light sources A, B, C and D being selected among said plurality of point light sources such that said four point light sources constitute a convex quadrilateral which has the smallest area and the shortest circumference length, and
   said images $A_1$, $B_1$, $C_1$ and $D_1$ being observed within a specific region which satisfies the following relationships (1) to (4) in a region surrounded by positions $A_0$, $B_0$, $C_0$ and $D_0$ which are positions of the projected image of the point light sources A, B, C and D on said light diffusing plate:

$$0.8 \times L(A_0C_0) > L(A_0A_1) > 0.2 \times L(A_0C_0) \quad (1)$$

$$0.8 \times L(A_0C_0) > L(C_0C_1) > 0.2 \times L(A_0C_0) \quad (2)$$

$$0.8 \times L(B_0D_0) > L(B_0B_1) > 0.2 \times L(B_0D_0) \quad (3)$$

$$0.8 \times L(B_0D_0) > L(D_0D_1) > 0.2 \times L(B_0D_0) \quad (4);$$

wherein L(XY) indicates a length of a line segment XY.

2. The direct-type backlight device according to claim 1 wherein:
   the shortest distance LP between two images selected from said images $A_1$, $B_1$, $C_1$ and $D_1$ satisfies the following relationships (5) and (6):

$$L(A_0C_0) \times 0.5 \geqq LP \geqq L(A_0C_0) \times 0.1 \qquad (5)$$

$$L(B_0D_0) \times 0.5 \geqq LP \geqq L(B_0D_0) \times 0.1 \qquad (6).$$

3. The direct-type backlight device according to claim 1 wherein:

said image forming position adjusting member is a fine concavo-convex structure formed on said light receiving surface and/or said light emitting surface, said fine concavo-convex structure being a structure of a plurality of pyramids having at least three planes which are aligned along a predetermined direction.

4. The direct-type backlight device according to claim 3 wherein:

said fine concavo-convex structure is formed on said light emitting surface.

5. The direct-type backlight device according to claim 3 wherein:

said light diffusing plate is in a shape approximate to a rectangle when viewed planarly, said plurality of point light sources are arranged along a lengthwise direction and a crosswise direction of said light diffusing plate with a predetermined interval, and said plurality of pyramids are aligned along a predetermined direction intersecting with said lengthwise direction and said crosswise direction.

6. The direct-type backlight device according to claim 1 wherein:

a front luminance of the image corresponding to a point light source at a position corresponding to an outer edge of the point light source is 15 to 100% relative to the maximum value of the front luminance in said image, wherein said front luminance is a luminance observed from a normal line direction of said light diffusing plate.

7. The direct-type backlight device according to claim 1 wherein:

in said image, a luminance observed from a direction inclined by 15° with respect to a normal line direction of said light diffusing plate when measured at a position having a maximum front luminance is 20% or more and less than 100% relative to a front luminance which is the luminance observed from the normal line direction.

8. The direct-type backlight device according to claim 3 wherein:

a mean line average roughness Ra of planes which compose said concavo-convex structure is 3 µm $\geqq$ Ra $\geqq$ 0.05 µm when a haze of said light diffusing plate is less than 20%, and is 2 µm $\geqq$ Ra $\geqq$ 0.0001 µm when the haze of said light diffusing plate is 20% or more and 100% or less.

9. The direct-type backlight device according to claim 1 wherein:

said image forming position adjusting member is a concavo-convex structure formed on said reflecting plate.

* * * * *